US010445848B2

(12) United States Patent
Petrovic et al.

(10) Patent No.: US 10,445,848 B2
(45) Date of Patent: Oct. 15, 2019

(54) CONTENT MANAGEMENT BASED ON DITHER-LIKE WATERMARK EMBEDDING

(71) Applicant: Verance Corporation, San Diego, CA (US)

(72) Inventors: Rade Petrovic, San Diego, CA (US); Jian Zhao, San Diego, CA (US); Joseph M. Winograd, San Diego, CA (US)

(73) Assignee: Verance Corporation, San Diego, CA (US)

(*) Notice: Subject to any disclaimer, the term of this patent is extended or adjusted under 35 U.S.C. 154(b) by 52 days.

(21) Appl. No.: 15/715,755

(22) Filed: Sep. 26, 2017

(65) Prior Publication Data

US 2018/0018748 A1    Jan. 18, 2018

Related U.S. Application Data

(62) Division of application No. 14/830,591, filed on Aug. 19, 2015, now Pat. No. 9,805,434.

(Continued)

(51) Int. Cl.
*G06K 9/00* (2006.01)
*G06T 1/00* (2006.01)
(Continued)

(52) U.S. Cl.
CPC ............ *G06T 1/0028* (2013.01); *G06F 21/16* (2013.01); *G06K 9/00744* (2013.01);
(Continued)

(58) Field of Classification Search
CPC .............................................. G06T 2201/005
See application file for complete search history.

(56) References Cited

U.S. PATENT DOCUMENTS

| 5,995,153 A | 11/1999 | Moeller et al. |
| 6,122,610 A | 9/2000 | Isabelle |

(Continued)

FOREIGN PATENT DOCUMENTS

| CN | 101546424 | 9/2009 |
| CN | 101751927 | 6/2010 |

(Continued)

OTHER PUBLICATIONS

"ATSC-3.0 Automatic Content Recognition Watermarking Solutions," ATSC Technology Group, Advanced Television Systems Committee, Inc., Jan. 2014 (6 pages).

(Continued)

*Primary Examiner* — Oneal R Mistry
(74) *Attorney, Agent, or Firm* — Perkins Coie LLP; Donald L. Wenskay

(57) ABSTRACT

Methods, devices and computer program products allow embedding and detection of watermarks into and from a multimedia content. One watermark embedding method includes selecting a content segment that lacks inherent features for embedding of watermarks without producing perceptible artifacts, and obtaining a first dither pattern corresponding to a first watermark symbol of a watermark symbol alphabet, where each symbol is associated with a particular dither pattern. Further, each particular dither pattern, upon combination with the multimedia content segment that lacks inherent features, produces a composite content segment without perceptible artifacts. By combining the first dither pattern with the multimedia content segment that lacks inherent features, a first composite content segment with the first embedded watermark symbol is produced. The detection of watermarks messages can be carried out quickly by examining a small portions of the multimedia (Continued)

because even the featureless content segments include embedded watermarks.

32 Claims, 6 Drawing Sheets

Related U.S. Application Data

(60) Provisional application No. 62/039,547, filed on Aug. 20, 2014.

(51) Int. Cl.
    *H04N 19/467* (2014.01)
    *H04N 5/08* (2006.01)
    *G06F 21/16* (2013.01)
    *H04N 21/00* (2011.01)
    *H04N 21/4627* (2011.01)
    *H04N 21/8358* (2011.01)
    *H04N 21/43* (2011.01)

(52) U.S. Cl.
    CPC ............ *G06T 1/005* (2013.01); *G06T 1/0085* (2013.01); *H04N 5/08* (2013.01); *H04N 19/467* (2014.11); *H04N 21/00* (2013.01); *H04N 21/4307* (2013.01); *H04N 21/4627* (2013.01); *H04N 21/8358* (2013.01); *G06T 2201/005* (2013.01); *G06T 2201/0065* (2013.01)

(56) References Cited

U.S. PATENT DOCUMENTS

| | | | |
|---|---|---|---|
| 6,145,081 A | 11/2000 | Winograd et al. |
| 6,175,627 B1 | 1/2001 | Petrovic et al. |
| 6,314,192 B1 | 11/2001 | Chen et al. |
| 6,411,725 B1 | 6/2002 | Rhoads et al. |
| 6,427,012 B1 | 7/2002 | Petrovic |
| 6,430,301 B1 | 8/2002 | Petrovic |
| 6,490,579 B1 | 12/2002 | Gao et al. |
| 6,546,424 B1 | 4/2003 | Cucchiara |
| 6,556,688 B1 | 4/2003 | Ratnakar |
| 6,577,747 B1 | 6/2003 | Kalker et al. |
| 6,683,958 B2 | 1/2004 | Petrovic |
| 6,721,439 B1 | 4/2004 | Levy et al. |
| 6,757,405 B1 | 6/2004 | Muratani et al. |
| 6,792,542 B1 | 9/2004 | Lee et al. |
| 6,839,673 B1 | 1/2005 | Choi et al. |
| 6,888,943 B1 | 5/2005 | Lam et al. |
| 6,895,430 B1 | 5/2005 | Schneider |
| 6,931,536 B2 | 8/2005 | Hollar |
| 7,024,018 B2 | 4/2006 | Petrovic |
| 7,092,774 B1 | 8/2006 | Gifford et al. |
| 7,140,043 B2 | 11/2006 | Choi et al. |
| 7,159,118 B2 | 1/2007 | Petrovic |
| 7,224,819 B2 | 5/2007 | Levy et al. |
| 7,343,397 B2 | 3/2008 | Kochanski |
| 7,460,667 B2 | 12/2008 | Lee et al. |
| 7,533,266 B2 | 5/2009 | Bruekers et al. |
| 7,548,565 B2 | 6/2009 | Sull et al. |
| 7,689,532 B1 | 3/2010 | Levy |
| 7,707,422 B2 | 4/2010 | Shin et al. |
| 7,774,834 B1 | 8/2010 | Chauhan et al. |
| 7,779,271 B2 | 8/2010 | Langelaar |
| 7,983,922 B2 | 7/2011 | Neusinger et al. |
| 7,986,806 B2 | 7/2011 | Rhoads |
| 7,991,995 B2 | 8/2011 | Rabin et al. |
| 8,005,258 B2 | 8/2011 | Petrovic et al. |
| 8,015,410 B2 | 9/2011 | Pelly et al. |
| 8,055,013 B2 | 11/2011 | Levy et al. |
| 8,059,815 B2 | 11/2011 | Lofgren et al. |
| 8,059,858 B2 | 11/2011 | Brundage et al. |
| 8,081,757 B2 | 12/2011 | Voessing et al. |
| 8,085,935 B2 | 12/2011 | Petrovic |
| 8,103,049 B2 | 1/2012 | Petrovic et al. |
| 8,138,930 B1 | 3/2012 | Heath |
| 8,151,113 B2 | 4/2012 | Rhoads |
| 8,181,262 B2 | 5/2012 | Cooper et al. |
| 8,189,861 B1 | 5/2012 | Rucklidge |
| 8,194,803 B2 | 6/2012 | Baum et al. |
| 8,249,992 B2 | 8/2012 | Harkness et al. |
| 8,259,873 B2 | 9/2012 | Baum et al. |
| 8,280,103 B2 | 10/2012 | Petrovic et al. |
| 8,301,893 B2 | 10/2012 | Brundage |
| 8,315,835 B2 | 11/2012 | Tian et al. |
| 8,321,679 B2 | 11/2012 | Petrovic et al. |
| 8,340,348 B2 | 12/2012 | Petrovic et al. |
| 8,346,532 B2 | 1/2013 | Chakra et al. |
| 8,346,567 B2 | 1/2013 | Petrovic et al. |
| 8,434,123 B2 | 4/2013 | Liwerant et al. |
| 8,467,717 B2 | 6/2013 | Croy et al. |
| 8,479,225 B2 | 7/2013 | Covell et al. |
| 8,483,136 B2 | 7/2013 | Yuk et al. |
| 8,533,481 B2 | 9/2013 | Petrovic et al. |
| 8,538,066 B2 | 9/2013 | Petrovic et al. |
| 8,560,604 B2 | 10/2013 | Shribman et al. |
| 8,588,459 B2 | 11/2013 | Bloom et al. |
| 8,589,969 B2 | 11/2013 | Falcon |
| 8,601,504 B2 | 12/2013 | Stone et al. |
| 8,615,104 B2 | 12/2013 | Petrovic et al. |
| 8,666,528 B2 | 3/2014 | Harkness et al. |
| 8,682,026 B2 | 3/2014 | Petrovic et al. |
| 8,713,618 B1 | 4/2014 | Kuznetsov |
| 8,726,304 B2 | 5/2014 | Petrovic et al. |
| 8,745,403 B2 | 6/2014 | Petrovic |
| 8,768,714 B1 | 7/2014 | Blesser |
| 8,781,967 B2 | 7/2014 | Tehranchi et al. |
| 8,791,789 B2 | 7/2014 | Petrovic et al. |
| 8,806,517 B2 | 8/2014 | Petrovic et al. |
| 8,811,655 B2 | 8/2014 | Petrovic et al. |
| 8,825,518 B2 | 9/2014 | Levy |
| 8,838,977 B2 | 9/2014 | Winograd et al. |
| 8,838,978 B2 | 9/2014 | Winograd et al. |
| 8,869,222 B2 | 10/2014 | Winograd et al. |
| 8,898,720 B2 | 11/2014 | Eyer |
| 8,923,548 B2 | 12/2014 | Petrovic et al. |
| 8,959,202 B2 | 2/2015 | Haitsma et al. |
| 8,990,663 B2 | 3/2015 | Liu et al. |
| 9,009,482 B2 | 4/2015 | Winograd |
| 9,042,598 B2 | 5/2015 | Ramaswamy et al. |
| 9,055,239 B2 | 6/2015 | Tehranchi et al. |
| 9,106,964 B2 | 8/2015 | Zhao |
| 9,117,270 B2 | 8/2015 | Wong et al. |
| 9,147,402 B2 | 9/2015 | Chen et al. |
| 9,277,183 B2 | 3/2016 | Eyer |
| 9,596,521 B2 | 3/2017 | Winograd et al. |
| 9,602,891 B2 | 3/2017 | Winograd et al. |
| 9,607,131 B2 | 3/2017 | Winograd et al. |
| 9,639,911 B2 | 5/2017 | Petrovic et al. |
| 9,681,203 B2 | 6/2017 | Winograd et al. |
| 9,769,543 B2 | 9/2017 | Petrovic et al. |
| 9,805,434 B2 | 10/2017 | Petrovic et al. |
| 9,854,331 B2 | 12/2017 | Winograd et al. |
| 9,854,332 B2 | 12/2017 | Winograd et al. |
| 9,942,602 B2 | 4/2018 | Petrovic et al. |
| 10,110,971 B2 | 10/2018 | Winograd et al. |
| 2001/0044899 A1 | 11/2001 | Levy |
| 2002/0032864 A1 | 3/2002 | Rhoads et al. |
| 2002/0059622 A1 | 5/2002 | Grove et al. |
| 2002/0078233 A1 | 6/2002 | Biliris et al. |
| 2002/0094082 A1 | 7/2002 | Jones et al. |
| 2002/0138695 A1 | 9/2002 | Beardsley et al. |
| 2002/0168087 A1 | 11/2002 | Petrovic |
| 2003/0012403 A1 | 1/2003 | Rhoads et al. |
| 2003/0055979 A1 | 3/2003 | Cooley |
| 2003/0065739 A1 | 4/2003 | Shnier |
| 2003/0084294 A1 | 5/2003 | Aoshima et al. |
| 2003/0103645 A1 | 6/2003 | Levy |
| 2003/0193616 A1 | 10/2003 | Baker et al. |
| 2003/0228030 A1 | 12/2003 | Wendt |
| 2004/0039914 A1 | 2/2004 | Barr et al. |
| 2004/0081079 A1 | 4/2004 | Forest et al. |

(56) References Cited

U.S. PATENT DOCUMENTS

| | | |
|---|---|---|
| 2004/0098370 A1 | 5/2004 | Garland et al. |
| 2004/0101160 A1 | 5/2004 | Kunisa |
| 2004/0202324 A1 | 10/2004 | Yamaguchi et al. |
| 2004/0250080 A1 | 12/2004 | Levy et al. |
| 2005/0036174 A1* | 2/2005 | Lubin .............. G06T 1/0028 358/3.14 |
| 2005/0071423 A1 | 3/2005 | Rajaniemi |
| 2005/0123169 A1 | 6/2005 | Wendt |
| 2005/0162682 A1* | 7/2005 | Aritomi .............. G06K 15/005 358/1.14 |
| 2005/0182792 A1 | 8/2005 | Israel et al. |
| 2006/0047704 A1 | 3/2006 | Gopalakrishnan |
| 2006/0053292 A1 | 3/2006 | Langelaar |
| 2006/0062426 A1 | 3/2006 | Levy et al. |
| 2006/0083242 A1 | 4/2006 | Pulkkinen |
| 2006/0115108 A1 | 6/2006 | Rodriguez et al. |
| 2006/0239501 A1 | 10/2006 | Petrovic et al. |
| 2006/0239503 A1 | 10/2006 | Petrovic et al. |
| 2007/0003103 A1 | 1/2007 | Lemma et al. |
| 2007/0039018 A1 | 2/2007 | Saslow et al. |
| 2007/0071037 A1 | 3/2007 | Abraham et al. |
| 2007/0074266 A1 | 3/2007 | Raveendran et al. |
| 2007/0135084 A1 | 6/2007 | Ido et al. |
| 2007/0208744 A1 | 9/2007 | Krishnaprasad et al. |
| 2007/0250560 A1 | 10/2007 | Wein et al. |
| 2008/0002854 A1 | 1/2008 | Tehranchi et al. |
| 2008/0037825 A1 | 2/2008 | Lofgren et al. |
| 2008/0263612 A1 | 10/2008 | Cooper |
| 2008/0273644 A1 | 11/2008 | Chesnutt et al. |
| 2008/0288983 A1 | 11/2008 | Johnson et al. |
| 2008/0297654 A1 | 12/2008 | Verberkt et al. |
| 2008/0301304 A1 | 12/2008 | Chitsaz et al. |
| 2009/0010487 A1 | 1/2009 | Maeno |
| 2009/0028331 A1 | 1/2009 | Millar et al. |
| 2009/0060055 A1 | 3/2009 | Blanchard et al. |
| 2009/0089078 A1 | 4/2009 | Bursey |
| 2009/0116743 A1* | 5/2009 | Kawakami .............. G06T 1/005 382/181 |
| 2009/0158318 A1 | 6/2009 | Levy |
| 2009/0319639 A1 | 12/2009 | Gao et al. |
| 2010/0023489 A1 | 1/2010 | Miyata et al. |
| 2010/0037138 A1 | 2/2010 | Shcherbakov et al. |
| 2010/0054531 A1 | 3/2010 | Kogure et al. |
| 2010/0063978 A1 | 3/2010 | Lee et al. |
| 2010/0097494 A1 | 4/2010 | Gum et al. |
| 2010/0111355 A1 | 5/2010 | Petrovic et al. |
| 2010/0131461 A1 | 5/2010 | Prahlad et al. |
| 2010/0172540 A1 | 7/2010 | Davis et al. |
| 2010/0174608 A1 | 7/2010 | Harkness et al. |
| 2010/0281142 A1 | 11/2010 | Stoyanov |
| 2010/0325646 A1 | 12/2010 | Alhadeff et al. |
| 2011/0004897 A1 | 1/2011 | Alexander et al. |
| 2011/0058188 A1 | 3/2011 | Guo et al. |
| 2011/0088075 A1 | 4/2011 | Eyer |
| 2011/0099594 A1 | 4/2011 | Chen et al. |
| 2011/0103444 A1 | 5/2011 | Baum et al. |
| 2011/0161086 A1 | 6/2011 | Rodriguez |
| 2011/0164784 A1 | 7/2011 | Grill et al. |
| 2011/0188700 A1 | 8/2011 | Kim et al. |
| 2011/0252342 A1 | 10/2011 | Broman |
| 2011/0261667 A1 | 10/2011 | Ren et al. |
| 2011/0281574 A1 | 11/2011 | Patel et al. |
| 2011/0286625 A1 | 11/2011 | Petrovic et al. |
| 2011/0293090 A1 | 12/2011 | Ayaki et al. |
| 2011/0307545 A1 | 12/2011 | Bouazizi |
| 2011/0320627 A1 | 12/2011 | Landow et al. |
| 2012/0023595 A1 | 1/2012 | Speare et al. |
| 2012/0027207 A1* | 2/2012 | Lee .............. G06T 1/0028 380/205 |
| 2012/0063635 A1 | 3/2012 | Matsushita et al. |
| 2012/0072731 A1 | 3/2012 | Winograd et al. |
| 2012/0102304 A1 | 4/2012 | Brave |
| 2012/0110138 A1 | 5/2012 | Zhang |
| 2012/0113230 A1 | 5/2012 | Jin |
| 2012/0117031 A1 | 5/2012 | Cha et al. |
| 2012/0122429 A1 | 5/2012 | Wood et al. |
| 2012/0129547 A1 | 5/2012 | Andrews, III et al. |
| 2012/0203556 A1 | 8/2012 | Villette et al. |
| 2012/0203734 A1 | 8/2012 | Spivack et al. |
| 2012/0216236 A1 | 8/2012 | Robinson et al. |
| 2012/0265735 A1 | 10/2012 | McMillan et al. |
| 2012/0272012 A1 | 10/2012 | Aronovich et al. |
| 2012/0272327 A1 | 10/2012 | Shin et al. |
| 2012/0300975 A1 | 11/2012 | Chalamala et al. |
| 2012/0304206 A1 | 11/2012 | Roberts et al. |
| 2012/0308071 A1 | 12/2012 | Ramsdell et al. |
| 2013/0007462 A1 | 1/2013 | Petrovic et al. |
| 2013/0007790 A1 | 1/2013 | McMillan et al. |
| 2013/0024894 A1 | 1/2013 | Eyer |
| 2013/0031579 A1 | 1/2013 | Klappert |
| 2013/0060837 A1 | 3/2013 | Chakraborty et al. |
| 2013/0073065 A1 | 3/2013 | Chen et al. |
| 2013/0077699 A1 | 3/2013 | Gifford et al. |
| 2013/0114848 A1 | 5/2013 | Petrovic et al. |
| 2013/0117571 A1 | 5/2013 | Petrovic et al. |
| 2013/0129303 A1 | 5/2013 | Lee et al. |
| 2013/0151855 A1 | 6/2013 | Petrovic et al. |
| 2013/0151856 A1 | 6/2013 | Petrovic et al. |
| 2013/0152210 A1* | 6/2013 | Petrovic .............. G06F 21/10 726/26 |
| 2013/0159546 A1 | 6/2013 | Thang et al. |
| 2013/0171926 A1 | 7/2013 | Distribeo |
| 2013/0188923 A1 | 7/2013 | Hartley et al. |
| 2013/0227293 A1 | 8/2013 | Leddy et al. |
| 2013/0246643 A1 | 9/2013 | Luby et al. |
| 2013/0271657 A1 | 10/2013 | Park et al. |
| 2013/0276046 A1 | 10/2013 | Park et al. |
| 2014/0037132 A1 | 2/2014 | Heen et al. |
| 2014/0047475 A1 | 2/2014 | Oh et al. |
| 2014/0059116 A1 | 2/2014 | Oh et al. |
| 2014/0059591 A1 | 2/2014 | Terpstra et al. |
| 2014/0067950 A1 | 3/2014 | Winograd |
| 2014/0068686 A1 | 3/2014 | Oh et al. |
| 2014/0071342 A1 | 3/2014 | Winograd et al. |
| 2014/0074855 A1 | 3/2014 | Zhao et al. |
| 2014/0075465 A1 | 3/2014 | Petrovic et al. |
| 2014/0075469 A1 | 3/2014 | Zhao |
| 2014/0114456 A1 | 4/2014 | Stavropoulos et al. |
| 2014/0115644 A1 | 4/2014 | Kim et al. |
| 2014/0130087 A1 | 5/2014 | Cho et al. |
| 2014/0142958 A1 | 5/2014 | Sharma et al. |
| 2014/0149395 A1 | 5/2014 | Nakamura et al. |
| 2014/0196071 A1 | 7/2014 | Terpstra et al. |
| 2014/0219495 A1 | 8/2014 | Hua |
| 2014/0257744 A1 | 9/2014 | Lokshin et al. |
| 2014/0267907 A1 | 9/2014 | Downes et al. |
| 2014/0270337 A1 | 9/2014 | Zhao et al. |
| 2014/0279549 A1 | 9/2014 | Petrovic et al. |
| 2014/0325550 A1 | 10/2014 | Winograd et al. |
| 2014/0325673 A1 | 10/2014 | Petrovic |
| 2015/0030200 A1 | 1/2015 | Petrovic et al. |
| 2015/0043728 A1 | 2/2015 | Kim et al. |
| 2015/0043768 A1 | 2/2015 | Breebaart |
| 2015/0052571 A1 | 2/2015 | Stokking et al. |
| 2015/0063659 A1 | 3/2015 | Poder et al. |
| 2015/0071153 A1 | 3/2015 | Hong et al. |
| 2015/0093016 A1 | 4/2015 | Jiang et al. |
| 2015/0121534 A1 | 4/2015 | Zhao et al. |
| 2015/0156536 A1 | 6/2015 | Kim et al. |
| 2015/0170661 A1 | 6/2015 | Srinivasan |
| 2015/0229979 A1 | 8/2015 | Wood et al. |
| 2015/0261753 A1 | 9/2015 | Winograd et al. |
| 2015/0264429 A1 | 9/2015 | Winograd et al. |
| 2015/0296274 A1 | 10/2015 | Good et al. |
| 2015/0324947 A1 | 11/2015 | Winograd et al. |
| 2015/0340045 A1 | 11/2015 | Hardwick et al. |
| 2016/0037189 A1 | 2/2016 | Holden et al. |
| 2016/0055606 A1 | 2/2016 | Petrovic et al. |
| 2016/0055607 A1 | 2/2016 | Petrovic et al. |
| 2016/0057317 A1 | 2/2016 | Zhao et al. |
| 2016/0148334 A1 | 5/2016 | Petrovic et al. |
| 2016/0150297 A1 | 5/2016 | Petrovic et al. |
| 2016/0182973 A1 | 6/2016 | Winograd et al. |
| 2016/0241932 A1 | 8/2016 | Winograd et al. |

(56) References Cited

U.S. PATENT DOCUMENTS

| | | | |
|---|---|---|---|
| 2017/0180809 | A1 | 6/2017 | An et al. |
| 2017/0251282 | A1 | 8/2017 | Winograd et al. |
| 2017/0272839 | A1 | 9/2017 | Winograd et al. |
| 2017/0280205 | A1 | 9/2017 | Winograd et al. |
| 2017/0374434 | A1 | 12/2017 | Petrovic et al. |
| 2018/0027306 | A1 | 1/2018 | An et al. |
| 2018/0192163 | A1 | 7/2018 | Winograd et al. |

FOREIGN PATENT DOCUMENTS

| | | |
|---|---|---|
| CN | 102474658 | 5/2012 |
| CN | 103299648 | 9/2013 |
| CN | 103533343 | 1/2014 |
| CN | 103975605 | 8/2014 |
| EP | 1474924 | 11/2004 |
| EP | 2439735 | 4/2012 |
| EP | 2489181 | 8/2012 |
| EP | 2899720 | 7/2015 |
| JP | 2004163855 | 6/2004 |
| JP | 2004173237 | 6/2004 |
| JP | 2004193843 | 7/2004 |
| JP | 2004194233 | 7/2004 |
| JP | 2004328747 | 11/2004 |
| JP | 2005051733 | 2/2005 |
| JP | 2005094107 | 4/2005 |
| JP | 2005525600 | 8/2005 |
| JP | 2007074495 | 3/2007 |
| JP | 20100272920 | 12/2010 |
| JP | 2011146823 | 7/2011 |
| JP | 2012217191 | 11/2012 |
| KR | 1020080087047 | 9/2008 |
| KR | 20100009384 | 1/2010 |
| KR | 10201016712 | 2/2011 |
| KR | 1020120083903 | 7/2012 |
| KR | 1020120128149 | 11/2012 |
| KR | 20130078663 | 7/2013 |
| KR | 1020130074922 | 7/2013 |
| KR | 101352917 | 1/2014 |
| KR | 10201424049 | 7/2014 |
| WO | 9803014 | 1/1998 |
| WO | WO 2000059148 | 10/2000 |
| WO | WO 2005017827 | 2/2005 |
| WO | WO 2005038778 | 4/2005 |
| WO | WO 2006051043 | 5/2006 |
| WO | WO 2008045880 | 4/2008 |
| WO | WO 2009031082 | 3/2009 |
| WO | WO 2010073236 | 7/2010 |
| WO | WO 2010135687 | 11/2010 |
| WO | WO 2011046590 | 4/2011 |
| WO | WO 2011116309 | 9/2011 |
| WO | WO 2012177126 | 12/2012 |
| WO | WO 2012177874 | 12/2012 |
| WO | WO 2013025035 | 2/2013 |
| WO | 2013067439 | 5/2013 |
| WO | 2013114939 | 8/2013 |
| WO | 2013119082 | 8/2013 |
| WO | 2013153718 | 10/2013 |
| WO | 2013176006 | 11/2013 |
| WO | WO 2013163921 | 11/2013 |
| WO | WO 2014014252 | 1/2014 |
| WO | 2014030924 | 2/2014 |
| WO | WO 2015138798 | 9/2015 |
| WO | WO 2015168697 | 11/2015 |
| WO | WO 2015174086 | 11/2015 |
| WO | WO 2016028934 | 2/2016 |
| WO | WO 2016028936 | 2/2016 |
| WO | WO 2016029055 | 2/2016 |
| WO | WO 2016086047 | 6/2016 |

OTHER PUBLICATIONS

Aris Technologies, Inc. "Audio Watermarking System to Screen Digital Audio Content for LCM Acceptance," May 1999 (17 pages).
Bangaleea, R., et al., "Performance improvement of spread spectrum spatial-domain watermarking scheme through diversity and attack characterisation," *IEEE Africon*, pp. 293-298, 2002.
Extended European Search Report dated Sep. 21, 2017 for European Application No. 15762332.3 (9 pages).
Furon, T., "A constructive and unifying framework for zero-bit watermarking," CS.MM, Jan. 12, 2007.
Hartung, F., et al., "Watermarking of MPEG-2 encoded video without decoding and re-coding," *Proc. SPIE Multimedia Computing and Networking 97*, 3020:264-274, Feb. 1997.
Hartung, F., et al., "Watermarking of uncompressed and compressed video," *Signal Processing*, 3(66):283-301, May 1998.
International Search Report and Written Opinion dated Apr. 12, 2016 for International Application No. PCT/US2015/066872, filed Dec. 18, 2015 (7 pages).
International Search Report and Written Opinion dated Aug. 13, 2015 for International Application No. PCT/US2015/029097, filed May 4, 2015 (14 pages).
International Search Report and Written Opinion dated Dec. 7, 2015 for International Application No. PCT/US2015/045960, filed Aug. 19, 2015 (14 pages).
International Search Report and Written Opinion dated Jan. 21, 2016 for International Application No. PCT/US2015/046166, filed Aug. 20, 2015 (8 pages).
International Search Report and Written Opinion dated Jan. 28, 2016 for International Application No. PCT/US2015/045964, filed Aug. 19, 2015 (8 pages).
International Search Report and Written Opinion dated Mar. 15, 2016 for International Application No. PCT/US2015/062514, filed Nov. 24, 2015 (10 pages).
International Search Report and Written Opinion dated May 28, 2015 for International Application No. PCT/US2015/020282, filed Mar. 12, 2015 (7 pages).
Kalker, T., et al., "System issues in digital image and video watermarking for copy protection," *Proc. IEEE Int. Conf. on Multimedia Computing and Systems*, pp. 562-567, Jun. 1999.
Kirovski, D., et al., "Multimedia content screening using a dual watermarking and fingerprinting system," *Proceedings of the tenth ACM international conference*, pp. 372-381, 2002.
Kirovski, D., et al., "Multimedia content screening using a dual watermarking and fingerprinting system," *Multimedia '02 Proceedings of the tenth ACM international conference on Multimedia*, 2002 (11 pages).
Office Action dated Jul. 28, 2016 for Korean Patent Application No. 10-2016-7002289 (11 pages).
Office Action dated Jun. 10, 2016 for Korean Patent Application No. 10-2016-7002291 (19 pages).
Office action dated Nov. 30, 2016 for Korean Patent Application No. 10-2016-7002289 (4 pages).
Verance Corporation, "Confirmedia," PowerPoint presentation made to National Association of Broadcasters, Apr. 24, 2001 (40 pages).
Zhao, J., "A WWW service to embed and prove digital copyright watermarks," *Proc. European Conf. on Multimedia Applications, Services and Techniques (ECMAST'96)*, May 1996 (15 pages).
Zhao, J., "Applying digital watermarking techniques to online multimedia commerce," *Proc. Int. Conf. on Imaging Science, Systems and Applications (CISSA'97)*, Jun./Jul. 1997 (7 pages).
Extended European Search Report dated Nov. 21, 2017 for European Application No. 15785628.7 (7 pages).
Partial Supplementary European Search Report dated Feb. 23, 2018 for European Application No. 15833725.3 (12 pages).
Extended European Search Report dated Feb. 23, 2018 for European Application No. 15833741.0 (8 pages).
"ATSC Candidate Standard: Interactive Services Standard," ATSC Technology Group, Advanced Television Systems Committee, Dec. 2013 (139 pages).
Extended European Search Report dated Mar. 5, 2018 for European Application No. 15834491.1 (8 pages).
Extended European Search Report dated Apr. 6, 2018 for European Application No. 15863968.2 (10 pages).
Office action dated Mar. 16, 2018 for Korean Patent Application No. 10-2017-7007558 (10 pages).

(56) References Cited

OTHER PUBLICATIONS

Office action dated Oct. 9, 2018 for Chinese Patent Application No. 201580019496.X (8 pages).
Extended European Search Report dated Jun. 4, 2018 for European Patent Application No. 15833725.3 (11 pages).
Office Action dated Feb. 4, 2019 for Japanese Patent Application No. 2016-556740 (10 pages).
Office Action dated Jan. 4, 2019 for Chinese Patent Application No. 201580055189.7 (9 pages).

* cited by examiner

CONTENT MANAGEMENT BASED ON DITHER-LIKE WATERMARK EMBEDDING

CROSS REFERENCE TO RELATED APPLICATIONS

This application is a divisional of U.S. patent application Ser. No. 14/830,591, filed on Aug. 19, 2015, which claims the benefit of priority of U.S. Provisional Patent Application No. 62/039,547, filed Aug. 20, 2014, the entire contents of which are incorporated by reference as part of the disclosure of this document.

TECHNICAL FIELD

The subject matter of this patent document relates to management of multimedia content and more specifically to embedding and detection of watermarks to facilitate recognition and utilization of multimedia content.

BACKGROUND

The use and presentation of multimedia content on a variety of mobile and fixed platforms have rapidly proliferated. By taking advantage of storage paradigms, such as cloud-based storage infrastructures, reduced form factor of media players, and high-speed wireless network capabilities, users can readily access and consume multimedia content regardless of the physical location of the users or the multimedia content. A multimedia content, such as an audiovisual content, can include a series of related images, which, when shown in succession, impart an impression of motion, together with accompanying sounds, if any. Such a content can be accessed from various sources including local storage such as hard drives or optical disks, remote storage such as Internet sites or cable/satellite distribution servers, over-the-air broadcast channels, etc.

In some scenarios, such a multimedia content, or portions thereof, may contain only one type of content, including, but not limited to, a still image, a video sequence and an audio clip, while in other scenarios, the multimedia content, or portions thereof, may contain two or more types of content such as audiovisual content and a wide range of metadata. The metadata can, for example include one or more of the following: channel identification, program identification, content and content segment identification, content size, the date at which the content was produced or edited, identification information regarding the owner and producer of the content, timecode identification, copyright information, closed captions, and locations such as URLs where advertising content, software applications, interactive services content, and signaling that enables various services, and other relevant data that can be accessed. In general, metadata is the information about the content essence (e.g., audio and/or video content) and associated services (e.g., interactive services, targeted advertising insertion).

The metadata can enable content management, annotation, packaging, and search throughout content production and distribution value chain. Since the introduction of digital TVs, metadata has been introduced to enable digital interactive features and services. Various standardization efforts (such as MPEG-7, MPEG-21, TV-Anytime, DVB-SI, ATSC) strive to produce metadata standards with predefined data structures and transport methods for describing essence to support interoperability and unified services.

While such metadata may be useful in some applications, especially for enabling broadcast interactive services, they must be interleaved, prepended or appended to a multimedia content, which occupies additional bandwidth and, more importantly, can be lost when content is transformed into a different format (such as digital to analog conversion, transcoded into a different file format, etc.), processed (such as transcoding), and/or transmitted through a communication protocol/interface (such as HDMI, adaptive streaming). Notably, in some scenarios, an intervening device such as a set-top box issued by a multichannel video program distributor (MVPD) receives a multimedia content from a content source and provides the uncompressed multimedia content to a television set or another presentation device, which can result in the loss of various metadata and functionalities such as interactive applications that would otherwise accompany the multimedia content. Therefore alternative techniques for content identification can complement or replace metadata multiplexing techniques.

One technique to mitigate the above problems is to embed watermarks into the content to enable automatic content recognition (ACR) and metadata recovery. Watermarks can be embedded in the audio and/or video portions of a content and are substantially imperceptible to a viewer (or listener) of the content. Properly designed watermarks can be immune to various content processing operations and channel impairments, such as compression and decompression, cropping, scaling, transcoding, format conversion, noise addition, acoustic propagation, optical (e.g., free space) transmission, digital-to-analog (D/A) and analog-to-digital (A/D) conversions and the like. Once detected by a watermark detector (also sometimes referred to as a watermark extractor), the payload of the watermark can be used to identify the content and recover the metadata associated with the identified content.

SUMMARY OF CERTAIN EMBODIMENTS

Figure 1:
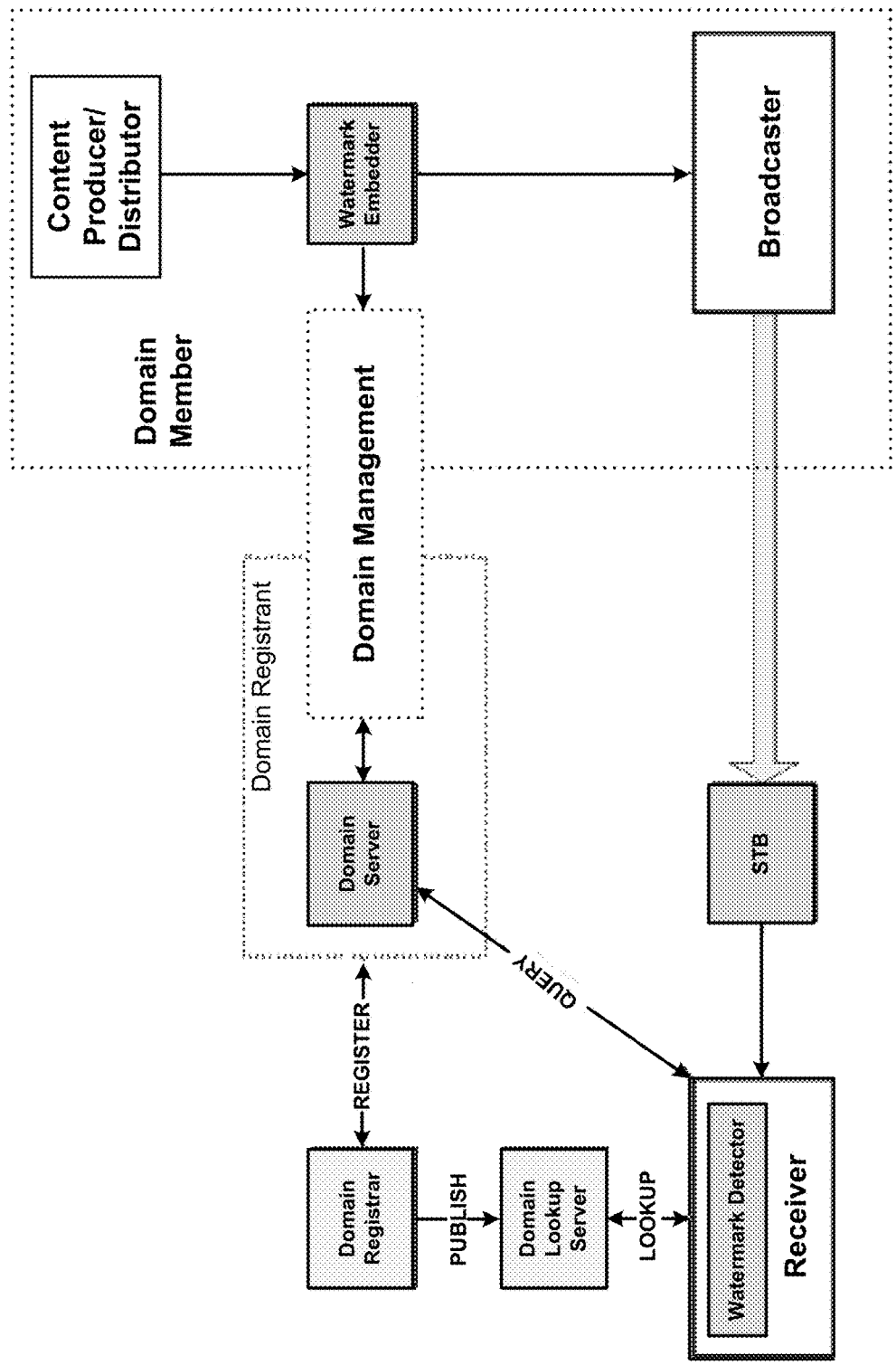
FIG. 1 illustrates a system for providing automatic content recognition and acquisition of interactive content in accordance with an exemplary embodiment.

The disclosed technology facilitates automatic recognition of a content, and enables rapid acquisition of metadata associated with the content.

One aspect of the disclosed technology relates to a method for embedding watermarks into a multimedia content that includes selecting a multimedia content segment that lacks inherent features for embedding of watermarks without producing perceptible artifacts, and obtaining a first dither pattern corresponding to a first watermark symbol.

The first watermark symbol is one of a plurality of watermark symbols of a watermark alphabet, and each symbol of the watermark alphabet is associated with a particular dither pattern. Each particular dither pattern, including the first dither pattern, upon combination with the multimedia content segment that lacks inherent features, produces a composite content segment without perceptible artifacts. The above noted method further includes combining the first dither pattern with the multimedia content segment that lacks inherent features to produce a first composite content segment with the first watermark symbol embedded therein.

In one exemplary embodiment, the multimedia content segment that lacks inherent features includes one or more of: an audio segment with audio characteristics below a predetermined threshold, an audio segment that is mute, a blank video frame, a video frame with a blanks portion, or a video frame or a section of a video frame with low visual activity.

In another exemplary embodiment, each particular dither pattern includes a sum of a plurality of selected sinusoids that produce either a positive autocorrelation value or a negative autocorrelation value depending on a corresponding symbol value of the watermark alphabet. In one exemplary embodiment, the watermark alphabet includes the first watermark symbol and a second watermark symbol, and the autocorrelation value is a short-term autocorrelation value obtained at a specified delay or shift value, $\tau$. In this embodiment, the sum of the plurality of selected sinusoids that correspond to the first watermark symbol is produced by selecting sinusoids which have an integer number of periods over the delay or shift value such that $F_n = n/\tau$, where n is an integer greater than or equal to 2, and $F_n$ is the frequency of the $n^{th}$ sinusoid, and the sum of the plurality of selected sinusoids that correspond to the second watermark symbol is produced by selecting sinusoids with frequencies $F_n = (n-0.5)/\tau$.

In one exemplary embodiment, the plurality of the selected sinusoids include sinusoids with random phases, and the sum of the plurality of selected sinusoids is produced by adding the selected sinusoids having the random phases. In another embodiment, the sum of the plurality of the selected sinusoids is produced by scaling and adding together the selected sinusoids to produce a particular ratio of peak-to-root-mean-square (RMS) value. In yet another exemplary embodiment, the sum of the plurality of the selected sinusoids is produced by scaling and adding together the selected sinusoids to produce a peak autocorrelation value that matches predefined target value depending on a corresponding symbol value of the watermark alphabet. In still another exemplary embodiment, the sum of the plurality of the selected sinusoids is produced by scaling and adding together the selected sinusoids to produce a particular signal-to-noise ratio (SNR) upon combination with the multimedia content segment that lacks inherent features.

According to another embodiment, the above noted method further includes obtaining a second dither pattern corresponding to a second watermark symbol of the watermark alphabet, wherein the second dither pattern, upon combination with the multimedia content segment that lacks inherent features, produces a composite content segment without artifacts. In this embodiment, the method also includes combining the second dither pattern with the multimedia content segment that lacks inherent features to produce a second composite content segment with the second watermark symbol embedded therein.

Another aspect of the disclosed technology relates to a device that includes a processor, and a memory including processor executable code. The processor executable code when executed by the processor causes the device to select a multimedia content segment that lacks inherent features for embedding of watermarks without producing perceptible artifacts, and obtain a first dither pattern corresponding to a first watermark symbol. The first watermark symbol is one of a plurality of watermark symbols of a watermark alphabet, and each symbol of the watermark alphabet is associated with a particular dither pattern. Further, each particular dither pattern, including the first dither pattern, upon combination with the multimedia content segment that lacks inherent features, produces a composite content segment without artifacts. The processor executable code when executed by the processor further causes the device to combine the first dither pattern with the multimedia content segment that lacks inherent features to produce a first composite content segment with the first watermark symbol embedded therein.

In one exemplary embodiment, the processor executable code when executed by the processor further configures the device to obtain a second dither pattern corresponding to a second watermark symbol of the watermark alphabet, where the second dither pattern, upon combination with the multimedia content segment that lacks inherent features, produces a composite content segment without artifacts. In this embodiment, the processor executable code when executed by the processor also configures the device to combine the second dither pattern with the multimedia content segment that lacks inherent features to produce a second composite content segment with the second watermark symbol embedded therein.

Another aspect of the disclosed embodiments relates to a computer program product, embodied on one or more non-transitory computer readable media, that includes program code for selecting a multimedia content segment that lacks inherent features for embedding of watermarks without producing perceptible artifacts. The one or more non-transitory computer readable media further include program code for obtaining a first dither pattern corresponding to a first watermark symbol, where the first watermark symbol is one of a plurality of watermark symbols of a watermark alphabet, and each symbol of the watermark alphabet is associated with a particular dither pattern. Further, each particular dither pattern, including the first dither pattern, upon combination with the multimedia content segment that lacks inherent features, produces a composite content segment without artifacts. The one or more non-transitory computer readable media also include program code for combining the first dither pattern with the multimedia content segment that lacks inherent features to produce a first composite content segment with the first watermark symbol embedded therein.

Another aspect of the disclosed technology relates to a method for embedding a watermark message into multiple segments of a multimedia including a featureless segment that includes receiving the multimedia content including the featureless segment that lacks inherent features for embedding of watermarks without producing perceptible artifacts, and obtaining the watermark message for embedding into the multimedia content, where the watermark message include a plurality of watermark symbols. The method for embedding a watermark message into multiple segments of the multimedia further includes embedding, using a first watermark embedding technique, at least one watermark symbol of the watermark message into a segment of the multimedia content other than the featureless segment, and embedding, using a second watermark embedding technique, one or more watermark symbols of the watermark message into the featureless segment. The embedding of the at least one watermark symbol using the second watermark technique includes obtaining either a first dither-like pattern corresponding to a first watermark symbol value or a second dither-like pattern corresponding to a second watermark symbol value, where the first and the second dither-like patterns, upon combination with the featureless segment, produce composite content segments without perceptible artifacts. The embedding of the at least one watermark symbol using the second watermark technique further includes combining the first dither-like pattern or the second dither-like pattern with the featureless segment to produce a composite content segment with the first watermark symbol or the second watermark symbol embedded therein.

In one exemplary embodiment, the first watermark embedding technique is a first variation of an autocorrelation modulation watermark embedding technique and the second watermark embedding technique is a second variation of the autocorrelation modulation watermark embedding technique. In another exemplary embodiment, boundaries of watermark symbols that are embedded in the featureless segment does not cross over to the segment of the multimedia content other than the featureless segment, and are thus fully contained within the featureless segment.

Another aspect of the disclosed technology relates to a processor and a memory including processor executable code. The processor executable code when executed by the processor causes the device to receive a multimedia content including a featureless segment that lacks inherent features for embedding of watermarks without producing perceptible artifacts, and obtain a watermark message for embedding into the multimedia content, where the watermark message includes a plurality of watermark symbols. The processor executable code when executed by the processor further causes the device to embed, using a first watermark embedding technique, at least one watermark symbol of the watermark message into a segment of the multimedia content other than the featureless segment, and embed, using a second watermark embedding technique, one or more watermark symbols of the watermark message into the featureless segment. The embedding of the at least one watermark symbol using the second watermark technique includes obtaining either a first dither-like pattern corresponding to a first watermark symbol value or a second dither-like pattern corresponding to a second watermark symbol value, where the first and the second dither-like patterns, upon combination with the featureless segment, produce composite content segments without perceptible artifacts. The embedding of the at least one watermark symbol using the second watermark technique further includes combining the first dither-like pattern or the second dither-like pattern with the featureless segment to produce a composite content segment with the first watermark symbol or the second watermark symbol embedded therein.

Another aspect of the disclosed embodiments relates to a computer program product, embodied on one or more non-transitory computer readable media, that includes program code for receiving the multimedia content including the featureless segment that lacks inherent features for embedding of watermarks without producing perceptible artifacts, and program code for obtaining the watermark message for embedding into the multimedia content, where the watermark message includes a plurality of watermark symbols. The one or more non-transitory computer readable media also include program code for embedding, using a first watermark embedding technique, at least one watermark symbol of the watermark message into a segment of the multimedia content other than the featureless segment, as well as program code for embedding, using a second watermark embedding technique, one or more watermark symbols of the watermark message into the featureless segment. The embedding of the at least one watermark symbol using the second watermark technique includes obtaining either a first dither-like pattern corresponding to a first watermark symbol value or a second dither-like pattern corresponding to a second watermark symbol value, where the first and the second dither-like patterns, upon combination with the featureless segment, produce composite content segments without perceptible artifacts. The embedding of the at least one watermark symbol using the second watermark technique also includes combining the first dither-like pattern or the second dither-like pattern with the featureless segment to produce a composite content segment with the first watermark symbol or the second watermark symbol embedded therein.

Another aspect of the disclosed techniques relates to a method for facilitating detection of watermarks from a multimedia content that includes receiving a multimedia content, where the multimedia content includes a first segment with one or more imperceptible watermark symbols, the one or more imperceptible watermark symbols having been embedded by combining a dither-like pattern corresponding to a first or a second watermark symbol with a featureless segment of the multimedia content. The featureless segment lacks inherent features for embedding of watermarks without producing perceptible artifacts. The method for facilitating detection of watermarks from a multimedia content also includes performing watermark extraction operations to recover the one or more imperceptible watermark symbols from the first segment of the multimedia content and to recover one or more additional watermark symbols from a second segment of the multimedia content that lacks the dither-like pattern. The method for facilitating detection of watermarks from a multimedia content further includes forming a recovered watermark message comprising a plurality of recovered watermark symbols including watermark symbols that are recovered from the first and from the second segments.

In one exemplary embodiment, the featureless segment of the multimedia content corresponds to one or more of: an audio segment with audio characteristics below a predetermined threshold, an audio segment that is mute, a blank video frame, a video frame with a blanks portion, or a video frame or a section of a video frame with low visual activity. In another exemplary embodiment, a speed of recovery of the watermark message is improved due to the recovery of the one or more watermark symbols from the first segment of the multimedia content. In yet another exemplary embodiment, each particular dither pattern associated with a corresponding watermark symbol value comprises a sum of sinusoids that produces either a positive autocorrelation value or a negative autocorrelation value depending on the corresponding watermark symbol value.

In another embodiment, performing watermark extraction operations includes obtaining a short-term autocorrelation value over a specified delay or shift value. This embodiment, upon obtaining a positive-valued short-term autocorrelation, further includes assigning a first value to the corresponding recovered watermark symbol, and upon obtaining a negative-valued short-term autocorrelation, further includes assigning a second value to the corresponding recovered watermark symbol. In another exemplary embodiment, the above noted method for facilitating detection of watermarks from a multimedia content further includes using the recovered watermark message to obtain one or more of: an identification value, a metadata, a second content, or a service associated with the multimedia content.

In one embodiment, the above method for facilitating detection of watermarks from a multimedia content additionally includes analyzing the first segment to determine whether or not the first segment is a low-activity content segment, and upon a determination that the first segment is a low-activity content segment, producing, based on the recovered watermark message, an indication that the low-activity segment is an inherent part of the multimedia content. In another exemplary embodiment, the above method for facilitating detection of watermarks from a multimedia content also includes further comprising receiving a third segment of the multimedia content, analyzing the third segment to determine whether or not the third segment is a low-activity content segment, and upon a determination that the third segment is a low-activity content segment, performing watermark extraction operations to determine whether or not at least one watermark symbol is recoverable from the third segment. In this embodiment, upon a determination that at least one watermark symbol is recoverable from the third segment, the method further includes producing an indication that the third segment is an inherent part of the multimedia content, and upon a determination that symbols are not recoverable from the third segment, the method further includes producing an indication that the third segment is an artificially created segment of the multimedia content.

In another exemplary embodiment, the artificially created segment of the multimedia content corresponds to one or more of the following operations: a pause operation during playback of the multimedia content, a fast forward operation during playback of the multimedia content, a rewind operation during playback of the multimedia content, a skip operation during playback of the multimedia content, or a channel change operation during playback of the multimedia content. In yet another embodiment, the above method further includes, upon a determination watermark symbols are not recoverable from the third segment, modifying presentation of a metadata, a second content, or a service associated with the multimedia content. In one embodiment, the modifying includes discontinuing presentation of the metadata, the second content, or the service associated with the multimedia content.

Another aspect of the disclosed embodiments relates to a device that includes a processor and a memory including processor executable code. The processor executable code when executed by the processor causes the device to receive a multimedia content, where the multimedia content includes a first segment with one or more imperceptible watermark symbols, the one or more imperceptible watermark symbols having been embedded by combining a dither-like pattern corresponding to a first or a second watermark symbol with a featureless segment of the multimedia content. The featureless segment lacks inherent features for embedding of watermarks without producing perceptible artifacts. The processor executable code when executed by the processor also causes the device to perform watermark extraction operations to recover the one or more imperceptible watermark symbols from the first segment of the multimedia content and to recover one or more additional watermark symbols from a second segment of the multimedia content that lacks the dither-like pattern. The processor executable code when executed by the processor additionally causes the device to form a recovered watermark message comprising a plurality of recovered watermark symbols including watermark symbols that are recovered from the first and from the second segments.

In one exemplary embodiment, the processor executable code when executed by the processor configures the device, as part of watermark extraction operations, to obtain a short-term autocorrelation value over a specified delay or shift value, and upon a determination of a positive-valued short-term autocorrelation, assign a first value to the corresponding recovered watermark symbol, and upon a determination of a negative-valued short-term autocorrelation, assign a second value to the corresponding recovered watermark symbol. In another exemplary embodiment, the processor executable code when executed by the processor further configures the device to use the recovered watermark message to obtain one or more of: an identification value, a metadata, a second content, or a service associated with the multimedia content.

According to another exemplary embodiment, the processor executable code when executed by the processor further configures the device to analyze the first segment to determine whether or not the first segment is a low-activity content segment, and upon a determination that the first segment is a low-activity content segment, produce, based on the recovered watermark message, an indication that the low-activity segment is an inherent part of the multimedia content. In another exemplary embodiment, the processor executable code when executed by the processor further configures the device to receive a third segment of the multimedia content, analyze the third segment to determine whether or not the third segment is a low-activity content segment. In this embodiment, the processor executable code when executed by the processor further configures the device to, upon a determination that the third segment is a low-activity content segment, perform watermark extraction operations to determine whether or not at least one watermark symbol is recoverable from the third segment, upon a determination that at least one watermark symbol is recoverable from the third segment, produce an indication that the third segment is an inherent part of the multimedia content, and upon a determination that at least one watermark symbol is not recoverable from the third segment, produce an indication that the third segment is an artificially created segment of the multimedia content.

Another aspect of the disclosed embodiments relates to a computer program product, embodied on one or more non-transitory computer readable media, that includes program code for receiving a multimedia content, where the multimedia content includes a first segment with one or more imperceptible watermark symbols, the one or more imperceptible watermark symbols having been embedded by combining a dither-like pattern corresponding to a first or a second watermark symbol with a featureless segment of the multimedia content. The featureless segment lacks inherent features for embedding of watermarks without producing perceptible artifacts. The one or more non-transitory computer readable media also include program code for performing watermark extraction operations to recover the one or more imperceptible watermark symbols from the first segment of the multimedia content and to recover one or more additional watermark symbols from a second segment of the multimedia content that lacks the dither-like pattern, as well as program code for forming a recovered watermark message comprising a plurality of recovered watermark symbols including watermark symbols that are recovered from the first and from the second segments.

DETAILED DESCRIPTION

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

As noted earlier, watermarks that are embedded into a multimedia content (e.g., in the audio or video portions) can be used for automatic content recognition (ACR). The payloads of the watermarks detected from a content can be used to identify the content and the temporal position (timing information) of the content segments that are being rendered. Further, the associated metadata can be recovered to enable various operations, such as receiving an additional content, performing dynamic advertising insertion, or participating in an interactive opportunity. The viewing device (or an associated device) can be connected to the Internet (or more generally, to a remote database) for the retrieval of the additional content, for participating in the interactive opportunities or other services.

In ACR applications, it is critical to be able to recognize a content very quickly so as to allow the associated content, metadata or interactive services to be readily accessed and provided to the users (who often have a short attention span). The speed of recovery of watermarks can, however, be challenged when the content includes substantially featureless segments that cannot suitably accommodate the embedded watermarks with acceptable levels of imperceptibility. Examples of such low-activity segments include an audio content with segments with little or no audio levels (e.g., segments with low signal energy or low volume levels that are below a predetermined threshold) or even completely muted sections. Similarly, a video content may have blank segments or segments with little visual activity, which are sometime called flat regions. Embedding those featureless segments using typical watermarking techniques often produces perceptible artifacts, which makes the content unacceptable for distribution. In some instances, featureless content segments can be produced due to normal activities during content processing and distribution, such as when an audio mute is created by a noise gate (i.e., a process carried out to control the volume of the audio signal prior to distribution), by application of profanity filters, or due to intentional content gaps left in place to enable subsequent insertion of advertisements at a downstream location within the content distribution chain.

In addition to the above described naturally occurring featureless segments (e.g., content segments that lack inherent features for embedding of watermarks without producing perceptible artifacts), artificial featureless content segments can be created because of disturbances during content playback. For example, when a content is being accessed on a content playback device, operations such as channel changes (e.g., on a Set Top Box), skip, pause, forward or backward within the content, etc. can create content gaps with no features. As will be described in detail below, in some applications, it is also desirable to distinguish the naturally occurring featureless segments from those created artificially through some type of content interruption.

The disclosed embodiments, among other advantages and benefits, address the above noted challenges by enabling the insertion of imperceptible watermarks throughout a content, including in the featureless sections of the content.

Examination of a variety of content types reveals that even in featureless content segments it is often possible to introduce a low level noise that is not objectionable to most users. Digital signal processing techniques sometimes use an intentionally applied form of noise, called dither, in order to randomize quantization error and to prevent large-scale patterns that may be caused if no dithering is applied. Although under special conditions dither may be perceptible, when designed properly, addition of dither to samples of a digital content can actually improve the perceived content quality by randomizing the digital artifacts that are often produced due to quantization noise.

The disclosed embodiments take advantage of human perception principles that make the addition of properly designed random noise (or dither) into a content non-objectionable (or even more appealing) to enable the embedding of watermarks into featureless segments of a content. In one exemplary embodiment, a watermark embedding technique, sometimes referred to as "auto-correlation modulation (ACM)," is specifically adapted to carry out dither-like watermark embedding. The basic principles of watermark embedding using autocorrelation modulation techniques is described in U.S. Pat. No. 5,940,135 (the "'135 patent"), which is commonly owned by the assignee of the present application. The contents of the '135 patent are incorporated by reference in this document.

As described in the '135 patent, a typical watermarking technique based autocorrelation modulation modulates or changes the short-term autocorrelation of a host content segment by adding to the host signal a host modifying signal having a positive or negative correlation with the original host signal. The short-term autocorrelation function is obtained by multiplying a signal with a delayed version of itself, and integrating the product over a predefined integration interval. The embedded signal is a controllably attenuated version of the host signal which has been delayed or advanced in accordance with the selected autocorrelation delay. The autocorrelation function can be modulated using the entire host signal or only a portion of it. In particular, frequency bands, temporal and/or spatial regions of the host signal can be chosen to minimize the disturbance to the host signal as it affects the perception of the signal's output (i.e., audio or video quality).

The detection of embedded watermarks can be carried out by computing the short-term autocorrelation value of a received content over the watermark symbol interval at the specified delay value(s). The polarity of the computed autocorrelation value can be mapped to each watermark symbol value (e.g., a positive polarity is indicative of a "0" symbol and a negative polarity is indicative of a "1" value). Alternatively, the autocorrelation value can be compared to predetermined levels that provide a mapping to the corresponding watermark symbol values.

In some variations of autocorrelation modulation technique, multiple host modifying signal components can be added to the host signal in the same or different frequency bands and temporal and/or spatial regions by generating host modifying signal components with different autocorrelation delays. The multiple host modifying signal components can represent different auxiliary or watermark information to increase overall auxiliary or watermark information throughput, or can represent the same auxiliary information to increase the robustness or security of the auxiliary information signal transmission.

In some embodiments, watermark embedding in featureless content segments is enabled by altering the above noted autocorrelation modulation technique to produce intentionally introduced dither-like components into the host content that are substantially imperceptible and, at the same time, carry watermark symbols.

Assuming that the watermark information is encoded by the polarity of the short-term autocorrelation on a specified delay, $\tau$, any sinusoid which has an integer number of periods over the delay $\tau$ has an autocorrelation coefficient equal to one (or close to it). In other words, all sinusoids with frequencies $F_n=n/\tau$, where n is an integer, will have a strong positive autocorrelation on the delay $\tau$. Similarly all sinusoids with frequencies $F_n=(n-0.5)/\tau$, where n is an integer, will have a strong negative autocorrelation on the delay $\tau$. As readily understood, in digital watermarking applications, the above noted sinusoids are digitally processed and modified using, for example, sampling and filtering operations that are part of standard digital signal processing operations.

One technique for randomizing quantization error is to combine many equidistant sinusoids with random phases produces a waveform that closely resembles noise. With proper scaling, the superposition of such sinusoids can produce the proper random quantization error that can be used for implementing dither. Therefore, watermark embedding can be effectuated by producing a dither-like signal that includes a plurality of specifically designed sinusoids and adding them to the host content. Such a dither-like signal can correspond to one watermark symbol value that is embedded into a segment of the host content. In an audio watermarking implementations, such a content segment can be a specific time interval of the host content. Further, the watermark symbols can be added to only a particular frequency band of the host content (e.g., in frequency band 100 Hz to 3,000). In this example, during a time interval where positive autocorrelation in the content is desired, the additional components that are added to the host content in that time interval are selected to include the sum of many (or all) frequencies (e.g., sinusoids) in the selected frequency range that satisfy the condition $F_n=n/\tau$. The selected sinusoids are then added together with pseudo-random phases. The pseudo-random phase selection improves imperceptibility of the added components by, for example, reducing peak-to-Root Mean Square (RMS) ratio of the sum of sinusoids.

In some embodiments, to reduce perceptibility of the added components, instead of using pseudo-random phases, the phases of the sinusoids are selected (e.g. experimentally) to produce a low, or potentially a minimum, ratio of signal peak to its RMS value. The frequency range from which $F_n$ is selected can roughly match the frequency range where the watermark signal resides.

This sum of sinusoids can then be scaled to make the signal peaks match a predefined target value, such as ±1 quant. Quant in the context of analog to digital (A/D) conversion corresponds to the separation between two adjacent quantization levels. Analog samples that fall in between quantization levels are rounded to the nearest quantization level before conversion to digital codes. Thus, the scaled value of the sum of sinusoids, in one example, can be made sufficiently small so as not to exceed ±1 quant. Alternatively, the sum of sinusoids can be scaled to make RMS value of the sum match a predefined target, such as −96 dB full-scale (i.e., 96 dB below the maximum sample values) for host content.

Similarly, during time intervals where a negative autocorrelation in the host content signal is desired, the additional components that are added to the host content in that time interval are selected to include the sum of many (or all) frequencies (or sinusoids) in the selected frequency range that satisfy $F_n=(n-0.5)/\tau$. The selection of the sinusoid phases again can be pseudo-random or tailored to minimize peak-to-RMS ratio. The scaling of this sum can also be done to match the same targets as for sinusoids with the positive autocorrelation. Thus, featureless segments of the content can be embedded by selecting specific dither-like patterns with short-term autocorrelation characteristics that correspond to the watermarks symbols (e.g., either a "0" or a "1"). The dither-like patterns are substantially imperceptible and can be scaled or modified to conform to a target measure of quality, such as signal peak-to-RMS ratio, or a target signal-to-noise ratio relative to the host content.

The ACM dither-like embedding described above can be used in parallel with regular embedding of watermarks, such as ACM embedding that is described in the '135 patent. In this case, it is essential that the embedded symbol values and the symbol boundaries are synchronized between the two watermarking processes (i.e., the "regular" watermark embedding in content segments that have sufficient features, and the dither-like embedding in content segments that lack sufficient features). For example, care must be taken so that embedding of each symbol does not cross over the boundary between the two types of segments. In some embodiments, the watermark embedder is configured to apply dither embedding (e.g., as a variation of ACM embedding) only upon a determination that the content segment is featureless (or lacks sufficient features) and that regular watermark embedding is insufficient to carry the desired watermark bit stream in the host content. In some embodiments, upon a determination that the host content contains only dither, the watermark embedder can be configured to remove the existing dither prior to using the disclosed dither-like embedding in order to avoid dither accumulation.

One exemplary procedure for embedding watermarks into a featureless segment of a host content can include obtaining a first dither pattern corresponding to one watermark symbol, where there are at least two watermark symbols in the watermark alphabet, and each symbol of the watermark alphabet is represented by a particular dither pattern. This is followed by incorporating the obtained dither pattern in the featureless segment of the host content, and obtaining an additional dither pattern corresponding to another watermark symbol, and repeating the previous operations. These operations can continue until desired or until the featureless segments of the host content are substantially embedded with watermarks.

The first or the additional dither patterns can include a sum of sinusoids that produce either a positive or a negative autocorrelation value when incorporated into the featureless host content segment. For example, each watermark symbol can be encoded as a polarity of a short-term autocorrelation at a specified delay value, $\tau$, where the sum of all sinusoids with frequencies, $F_n=n/\tau$ (n being an integer that is greater than 1—although in some embodiments n is larger than 5), which have a strong positive autocorrelation at delay value, $\tau$, is used to embed a first watermark symbol value, and sum of all sinusoids with frequencies, $F_n=(n-0.5)/\tau$, having a strong negative autocorrelation at the delay $\tau$ is used to embed a second watermark symbol. As noted earlier, the sinusoids can have random phases and are scaled and added together. Alternatively, the phases of sinusoids can be selected to produce a particular ratio of signal peak to its Root-Mean-Square (RMS) value. Moreover, the sum of the sinusoids can be scaled to make signal peaks match a predefined target value, such as one of a +1 or −1 value, when embedding a first or a second symbol value, respectively.

The above noted techniques can be readily extended to allow embedding of watermarks into image frames of a multimedia content. In particular, an image frame is typically divided into multiple tiles, and a watermark symbol is embedded into each tile (although in some applications, the entire image frame can be construed as a single tile for embedding of a watermark symbol). The delay, $\tau$, in the above description becomes a spatial shift that can have components in two spatial dimensions (e.g., x- and y-dimensions). The remaining operations are similarly extended into the spatial and spatial frequency domains.

The ability to successfully embed substantially featureless segments of a content can also facilitate identification of artificially created featureless content segments. As noted earlier, when a content's rendering timeline is disturbed (e.g. when a user decides to switch from one content to another or chooses to skip forward or backward within the content), the content player typically performs additional processing operations, which leads to a brief playback interruption that can be detected as a silence interval in an audio portion of multimedia content, or as a featureless (e.g., blank) frame or set of frames in a video portion. Timely detection of such playback interruptions can be important in certain applications where those interruptions are used to trigger additional events. For example, a content interruption caused by a channel change can provide a trigger for discontinuing the playback of an associated secondary content (e.g., an advertisement, an interactive content or service, etc.).

While such interruptions can be quickly identified by detecting an audio silence or a group of featureless (e.g., blank) screens, they would be indistinguishable from naturally occurring featureless segments of the multimedia content in the absence of dither embedding. In the presence of dither embedding, however, the device can determine whether or not a detected silent or featureless segment (e.g., a "gap") includes embedded watermark symbols, and if so, identify the segment as a naturally occurring segment of the multimedia content. In one example, the watermark bit (or symbol) string that is expected to be present in the gap can be formed and used as a template. A watermark extractor can process the content segment to determine if such a string or template is found within the gap with a certain level of confidence (e.g., with few mismatches). If the expected bit string is found, then the gap is considered to have existed in the content prior to embedding of watermarks, and as an inherent part of the content. But if the expected string is not found, then the gap is likely created by playback disturbances, such as switching from one content to another, or skipping forward or backward within the content. Note that in some content distribution use cases, at least some watermark embedding operations are carried out as part of the final content distribution phase (e.g., in order to discriminate different distribution channels via embedded watermarks) and thus all gaps that are present at the final content distribution phase can be covered with watermarks using the disclosed dither-like embedding techniques. In such applications, the absence of embedded watermarks in a detected featureless or low-activity segment can be indicative of intentional content interruptions.

FIG. 1 illustrates a system for providing automatic content recognition for content that is provided by a broadcaster or redistributor to a consumer device and acquisition of interactive content that can be used for accommodating the disclosed embodiments. The system of FIG. 1 is one example of an ecosystem that can accommodate, and benefit from, the disclosed dither-like watermark embedding techniques. The system of FIG. 1 is compatible with the requirements of the Advanced Television Systems Committee (ATSC), Inc., Call for Proposals For ATSC-3.0 AUTOMATIC CONTENT RECOGNITION WATERMARKING SOLUTIONS—ATSC Technology Group 3 (ATSC 3.0) (S33 Doc. 067r3).

The content in FIG. 1 is embedded with watermarks, including dither-like watermarks embedded in substantially featureless content segments, by a Domain Member prior to broadcast. For example, such a Domain Member can be a content producer or a Broadcaster. A Broadcaster (which can also be called a Redistributor) transmits the content to one or more user premises. Such content is often received at a receiver such as a set top box (STB), where decompression and formatting operations may take place before the content is provided (typically via a HDMI interface) to a viewing device (sometimes referred to as the "Receiver" or the "Receiver Device"). Such a Receiver can be compliant with the ATSC 3.0 standard. Decompression and formatting may alternatively take place within the Receiver. The Receiver which includes a watermark detector, examines the received content for the presence of watermarks, including watermarks that are embedding using a dither-like embedding technique. The detection of watermarks may trigger further actions such as identifying a domain name associated with the detected watermark payload and sending a query to an identified domain server. The Receiver also can detect featureless content segments that are devoid of embedded watermarks, and thus provide an indication that an artificially created gap (e.g., due to content pause, fast-forward, rewind and/or channel change) has been detected. The detection of such gaps can lead to additional actions such as presentation (or removal) of advertisements or associated second contents and/or services.

It should be noted that while in some implementations, the Receiver is a separate component than the set-top box, in other implementations the Receiver may include, or be part of a larger device that includes, any one or combinations of additional components such as a set-top box, a display, keyboard or other user interface devices, or a watermark detector, as well as processors (e.g., microprocessors, digital signal processors (DSPs), etc.) and other circuitry that may be needed for implementation of such device, or devices.

The watermark structure in some exemplary embodiments includes the following fields: a Domain ID and a Sequence ID. Each Domain ID is assigned by a central authority to a Domain Registrant who controls assignment and use of the Sequence ID codes under that domain. Each Domain ID maps one-to-one to an Internet domain name which is used to retrieve metadata associated with Sequence IDs in that domain. The Domain Registrar in FIG. 1 is a unique centralized entity responsible for registering such Domain IDs and publishing the mapping between the Domain IDs and domain names to Domain Lookup Servers. Domain registration is a process wherein a Domain ID is uniquely assigned to a Domain Registrant entity. The Domain Registrar provides Domain Registrant with a process (e.g., designated as REGISTER in FIG. 1) to establish and maintain the relationship between the Domain ID and a domain name (e.g., Internet format). Multiple Domain IDs may be mapped to the same domain name. The Domain Registrar further maintains a database of all mappings from Domain IDs to domain names. The Domain Registrar employs a standardized protocol (e.g., designated as PUBLISH in FIG. 1) to publish new and modified domain mappings to Domain Lookup Services that can include Domain Lookup Servers, as well as any other devices that may be needed to implement Domain Lookup Services. This protocol used by the Domain Registrar enables interoperability between the central Domain Registrar and all Domain lookup services. In some implementations, support for PUBLISH protocol is mandatory on both the Domain Lookup Servers and the Domain Registrar.

Domain Lookup Server(s) maintain a copy of the Domain Registration database which maps each registered Domain ID to a domain name and keeps it current using the PUBLISH protocol with the Domain Registrar. Domain Lookup Server(s) also employ a standardized protocol (e.g., designated as LOOKUP in FIG. 1) to provide domain name mappings from the database in response to Domain ID lookup queries originated by the Receivers. The use of a standardized LOOKUP protocol allows interoperability between any Receiver and any Domain Lookup Server. In some embodiments the Receivers are ATSC-compatible or ATSC-complaint. That is, those receivers comply with ATSC requirements, such as those under ATSC 3.0.

Domain Servers can be Internet servers that are accessible at the domain name associated with a registered Domain ID and can provide metadata to Receivers in response to queries triggered by watermark detections. In some implementations, queries employ a standardized message protocol (e.g., designated as QUERY in FIG. 1). A query is initiated by a Receiver and provides the domain server with a Domain ID and Sequence ID. The Domain Server responds with available metadata (e.g. broadcast channel identifier, a broadcast segment identifier, a timecode, a signaling) associated with the provided Domain ID and Sequence ID. Domain servers are not required to provide data for all required data fields available for all queries. In some embodiments, support for the QUERY protocol is mandatory on all Receivers and Domain Servers in order to enable interoperability among all receivers and content. This protocol enables interoperability between all receivers and all domain servers and support may be mandatory on both the receivers and the domain servers.

Example Watermark Payload: In one example implementation, a 50-bit payload can be embedded in every 1.5 seconds of the content. In this example, the watermark payload can be standardized with the following structure: [Payload Type:2] [Payload:48]. That is, the right-most 48 bits are designated to carry the payload and the 2 left-most bits are designated to carry the Payload Type. For example, the Payload Type values can be in the range 0 to 3, where a "0" designates a Reserved payload type, a "1" designate a Large Domain payload type, a "2" designates a Medium Domain payload type, and a "3" designates a Small Domain payload type. The payload type values can thus each describe the structure of the payload. The payload structure for each payload type can be further defined according to the following example format:

Small Domain: [Domain field:30 bits] [Sequence field:17 bits] [Trigger field:1 bit]
Medium Domain: [Domain field:22 bits] [Sequence field:25 bits] [Trigger field:1 bit]
Large Domain: [Domain field:18 bits] [Sequence field:29 bits] [Trigger field:1 bit]

The Domain field from any structure can be mapped into a unique Domain ID by prepending the Payload Type value to the Domain field and zero-padding (on the right) to 32 bits. For ASCII encoding, the Domain ID can be represented as an 8-character hexadecimal value. Domain field value of 0 can be reserved in all domains. The Sequence field from any structure can be mapped directly into a Sequence ID. For ASCII encoding, hexadecimal representation of the Sequence field (leading zeroes optional) can be utilized. Sequence IDs with decimal value of 1024 or less can be reserved for use as Control Codes. Control Codes are currently reserved.

The trigger bit, when set (e.g. to a value of "1"), can inform the Receiver of an event that may activate the Receiver to perform various operations such as requesting metadata from the domain server. It indicates that further services or features, such as interactive content or advertising insertion associated with the Sequence ID should be available to the Receiver from the domain server associated with the payload's Domain ID. In some implementations the trigger field can include multiple bits.

One of the services caused by triggers may be presentation of a secondary audiovisual content, typically delivered via Internet, such as pre-fetched advertisements. Such audiovisual content is treated as regular audiovisual content, i.e., it can also be watermarked and watermark-based triggers can be registered with a domain server. Thus, the watermark payloads in the secondary content can also trigger interactive services. This is sometimes called "nested triggers".

Using the above watermark payload structures, if we assume that a watermark payload has temporal duration of 1.5 seconds, over 250,000 Large Domains can be identified (e.g. for long-term continuous embedding) that would allow 25.5 years of uniquely marked content per domain. This structure further allows over 4 Million Medium domains to be uniquely identified (e.g. for continuous marking of Olympics-scale events, annual channel assignments, or long-term selective embedding) that would allow 1.5 years of uniquely marked content per domain. The structure for Small Domains allows unique identification of over 1 Billion Small Domains (e.g. shows) with 54 hours of uniquely marked content per domain. Depending on the payload type, a domain may be assigned to one or more 1) broadcasters or content producers; 2) MVPDs; 3) channels; 4) sport events; 5) shows; 6) movies; or 7) episodes.

The watermark payload can undergo various coding, modulation and formatting operations before being embedded into a content. For example, the payload may be error correction code (ECC) encoded, scrambled, interleaved with other packets, appended with a synchronization or registration header, encrypted or channel coded to form a sequence of bits with particular characteristics. Once embedded, the embedded content can be processed by a watermark extractor to recover the embedded watermark bits (or, more generally, symbols), and perform the reverse of the above coding, modulation or formatting schemes to recover the payload. In some instances, statistical techniques are used to recover the embedded symbols from the content using multiple instances of embedded watermarks.

Figure 2:
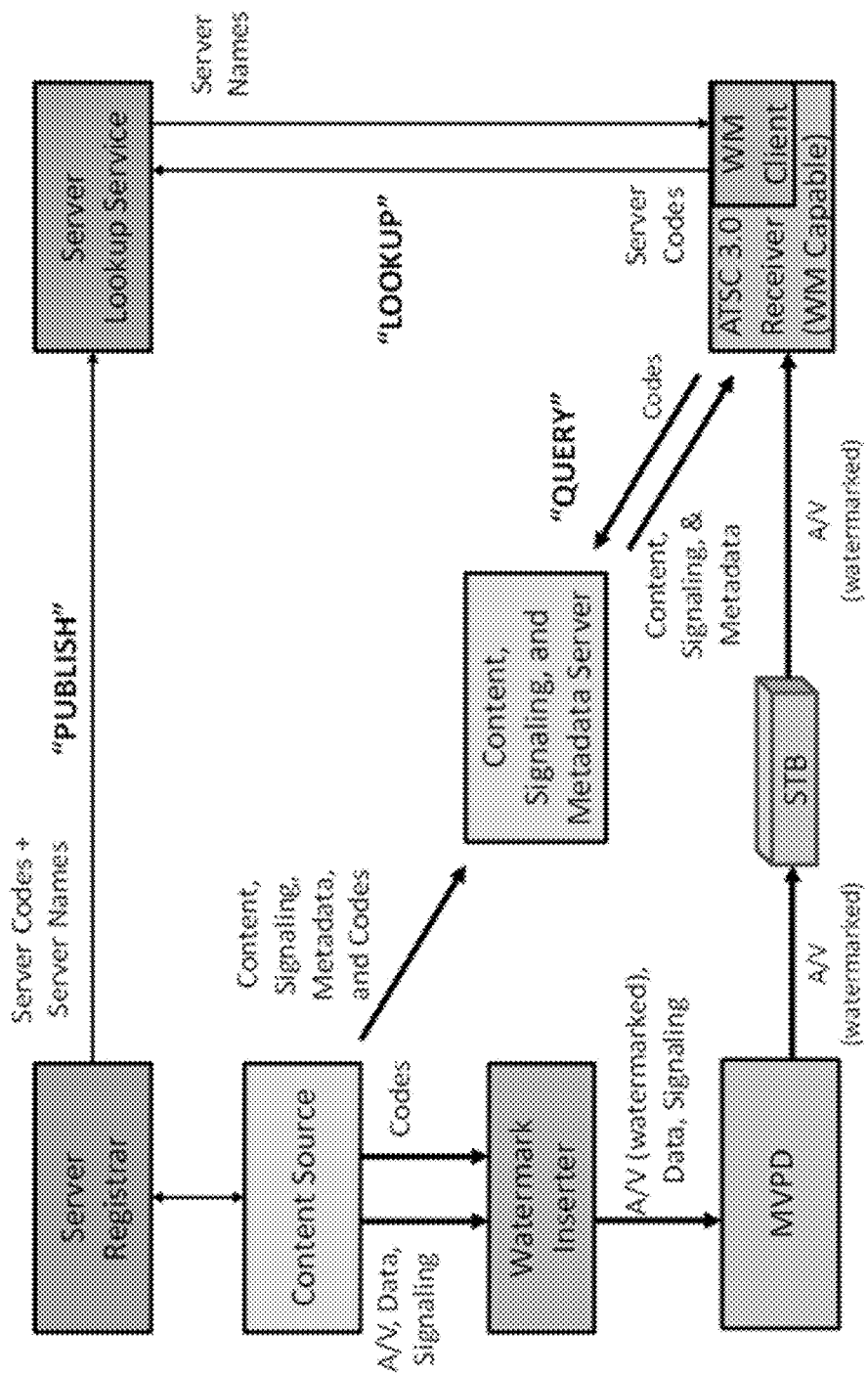
FIG. 2 illustrates another system and associated components that enables automatic content recognition and acquisition of corresponding metadata in accordance with an exemplary embodiment.

FIG. 2 provides another exemplary system that can accommodate, and benefit from, the disclosed dither-like watermark embedding techniques, while conforming to ACR requirements of ATSC 3.0. Several components that are shown in FIG. 2 can find analogous counterparts in FIG. 1. For example, the Server Registrar and the Domain Registrar; the Content, Signaling and Metadata Server and Domain Server; and the Server Lookup Service/server and Domain Lookup Server can carry out analogous operations. The various components in FIG. 2 are further described below. A Server Registrar is established by ATSC for the purpose of registering ATSC Domains and assigning to each a unique Server Code. Registrants inform the registrar of a Server Name, which is the Internet domain name or URL at which metadata services associated with the Code Domain are located. The Server Registrar publishes the Server Code and associated Server Name to the Server Lookup Services.

One or more Server Lookup Services are established. These services may be operated by ATSC, the Server Registrar, Content Owners, ATSC Receiver manufacturers, or a third party. Each Server Lookup Service maintains a database of all Server Code/Server Name associations published by the Server Registrar and responds to lookup requests from ATSC Receivers. The Server Lookup Services do not need to access or store any broadcast metadata; they simply provide ATSC Receivers with access to Server Names associated with Server Codes detected from broadcast watermarks.

A Content Source, acting either as a Server Registrant or in concert with a Server Registrant, associates a valid registered Server Code and one or more unique Interval Codes and maps them to intervals of broadcast content essence. The Content Source embeds those codes in the broadcast content using a Watermark Inserter prior to delivery of the broadcast content to an MVPD. The Sever Code can be analogous to the Sequence ID described in the exemplary watermark payload above. Such embedding include embedding of substantially featureless content segments using the disclosed dither-like watermark embedding techniques.

The Interval Codes and the metadata for those same intervals of broadcast essence (e.g. any interactive content, signaling, metadata, triggers, channel identifier, media timeline timecode, etc.) are associated together in a database which is provided to a Content, Signaling, and Metadata Server ("CSM Server"). Content Sources may associate and embed watermarks continuously throughout their program material using sequentially increasing Interval Codes (e.g., analogous the Sequence ID described in the exemplary watermark payload above), may embed watermarks only in those intervals of content where interactive services are enabled, or may embed an Interval Code repeatedly through a program segment where an interactive service is available but does not require timing precision. Content Sources may register additional Code Domains in advance of depleting the Interval Code space associated with a given Server Code and may associate newly assigned Server Codes with the same Internet domain name to maintain infrastructure continuity.

The CSM Server responds to various requests from ATSC Receivers, including delivery of signaling and interactive content based on interactive service data received from a complete broadcast stream. The CSM Server also responds to code metadata queries, in which a query containing the watermark payload (e.g. in the ASCII representational format) is submitted by the WM Client in an ATSC Receiver, with a request for metadata associated with the interval of broadcast content. The metadata included in the CSM Server response may include channel identifiers, timecodes, content or segment identifiers, triggers, etc. It should be noted that while metadata services can be hosted in the same servers as the content and signaling services, they may alternatively be hosted on different servers from those used for content and signaling services.

ATSC Receivers may obtain broadcast content essence absent the full ATSC broadcast stream from an MVPD via a STB. The ATSC receiver may provide the content essence to the watermark client for detection of any embedded codes. The detection of watermarks includes detecting watermarks that have been embedded in featureless segments of the content using the disclosed dither-like watermark embedding techniques. The Receiver also can detect featureless content segments that are devoid of embedded watermarks, and thus provide an indication that an artificially created gap has been detected. As noted earlier, such a gap can be due to content interruptions such as pause, fast-forward, rewind and/or channel change. As part of watermark client implementation in a given product, associations between Server Codes and Server Names can be stored in a cache (e.g., memory device), but it can also include the Internet address of a Server Lookup Service so that it may lookup newly registered or modified Server Names. The cache may be pre-populated at the time at ATSC Receiver manufacture to reduce traffic to Server Lookup Services.

When the watermark client detects a watermark payload embedded in the content it is playing, it checks to see whether or not the detected Server Code is present in its cache. If it is, the watermark client queries the CSM Server whose Server Name is associated with the Server Code to obtain the metadata associated with the detected watermark payload. If the Server Code from the detected watermark is not present in its cache, or if the contacted server fails to respond as expected, the watermark client may look up the current Server Name associated with the Server Code from the Server Lookup Service, cache the result, and then initiate a query directed at the newly identified Server Name.

Watermark clients may be configured to initiate a query only for certain watermark detections; e.g. the first one after playback begins, the first one after a channel change, only those with the Trigger field set if a query has not been performed within the past, e.g., 30 seconds, etc. Timecode metadata provided to watermark clients by the CSM Server can be used in conjunction with data recovered from the watermark detection process to determine the original media timecode of the broadcast content with frame or millisecond accuracy.

To enable the architecture that is depicted in FIG. 2, open standards can be provided for the following three network protocols: PUBLISH, LOOKUP, and QUERY.

PUBLISH is a protocol whereby the Server Registrar notifies interested ecosystem participants of a newly established or updated mapping between a Server Code and an Internet domain name and publishes the association to Server Lookup Services.

LOOKUP is a protocol whereby an ATSC Receiver can submit a Server Code to a Server Lookup Service and receive a response containing the associated Server Name which has been most recently published by the Server Registrar.

QUERY is a protocol whereby an ATSC Receiver can submit a Server Code and Interval Code to a CSM Server and receive ATSC metadata (e.g. channel, timecode, interactive services triggers, etc.) associated with the specified interval of broadcast content.

Figure 3:
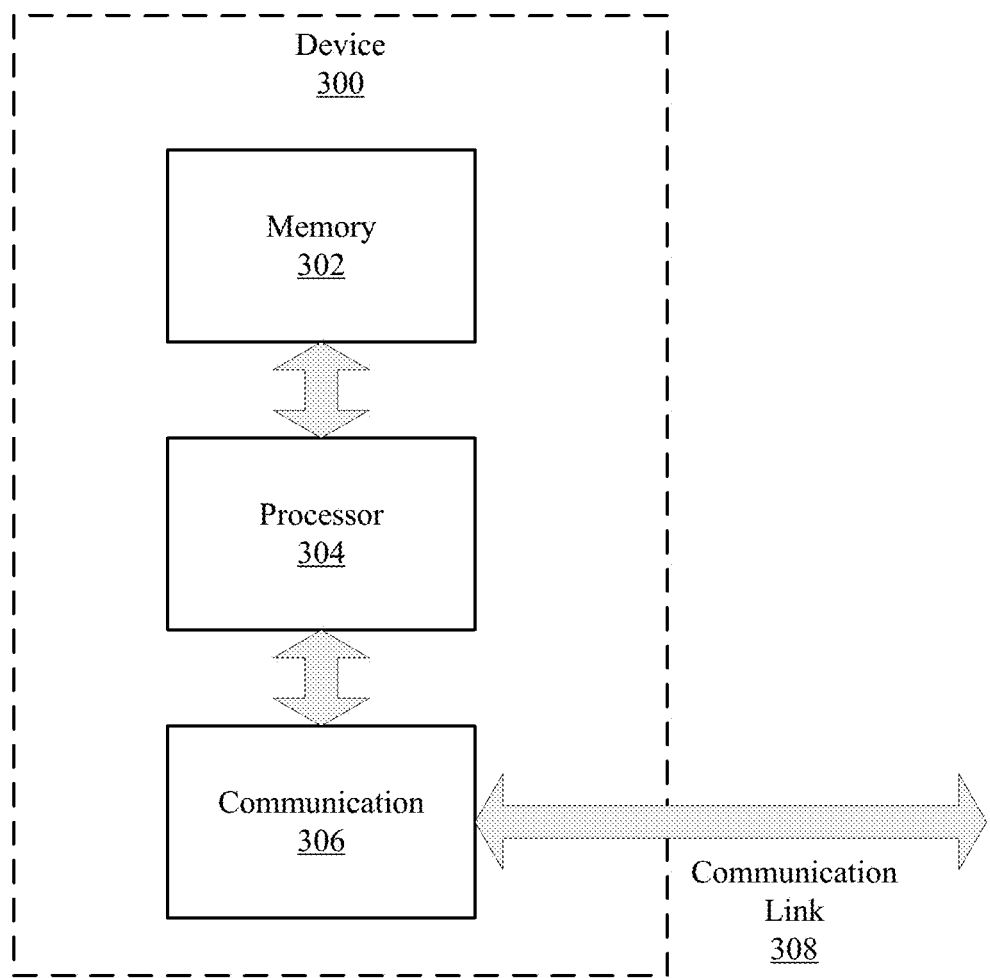
FIG. 3 illustrates a block diagram of a device for implementing various disclosed embodiments.

Certain aspects of the disclosed embodiments can be implemented as a device that includes a processor, and a memory comprising processor executable code. The processor executable code, when executed by the processor, configures the device to perform any one of and/or all operations that are described in the present application. FIG. 3 illustrates a block diagram of a device 300 within which various disclosed embodiments may be implemented. The device of FIG. 3 can be implemented as part of any one of: the Receiver device or the Watermark Embedder that are shown in FIG. 1, or as part of the Watermark Insertor, the Receiver, or the Watermark Client that are shown in FIG. 2. The device 300 comprises at least one processor 304 and/or controller, at least one memory 302 unit that is in communication with the processor 304, and at least one communication unit 306 that enables the exchange of data and information, directly or indirectly, through the communication link 308 with other entities, devices, databases and networks. The communication unit 306 may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The exemplary device 300 of FIG. 3 may be integrated as part of any devices or components shown in FIG. 1 or FIG. 2 to perform any of the disclosed methods.

Figure 4:
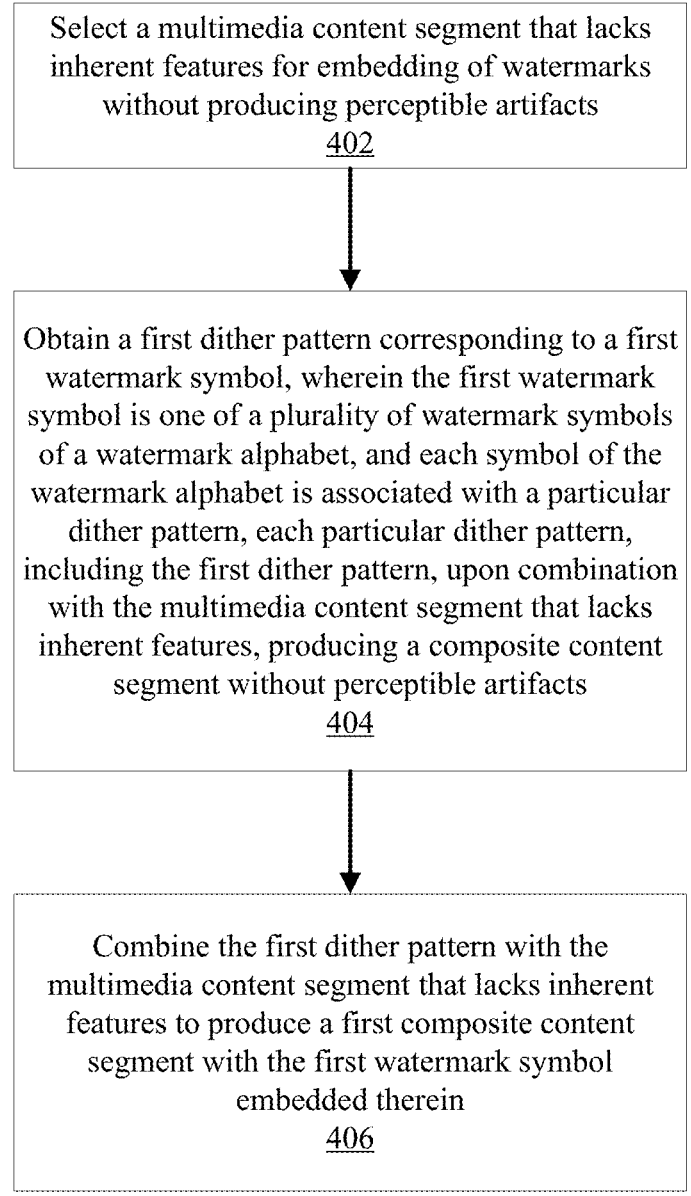
FIG. 4 illustrates a set of operations that can be carried out for embedding watermarks into a multimedia content in accordance with an exemplary embodiment.

FIG. 4 illustrates a set of operations that can be carried out for embedding watermarks into a multimedia content in accordance with an exemplary embodiment. At 402, a multimedia content segment is selected that lacks inherent features for embedding of watermarks without producing perceptible artifacts. At 404, a first dither pattern is obtained that corresponds to a first watermark symbol. The first watermark symbol is one of a plurality of watermark symbols of a watermark alphabet, and each symbol of the watermark alphabet is associated with a particular dither pattern. Moreover, each particular dither pattern, including the first dither pattern, upon combination with the multimedia content segment that lacks inherent features, produces a composite content segment without perceptible artifacts. At 406, the first dither pattern is combined with the multimedia content segment that lacks inherent features to produce a first composite content segment with the first watermark symbol embedded therein.

Figure 5:
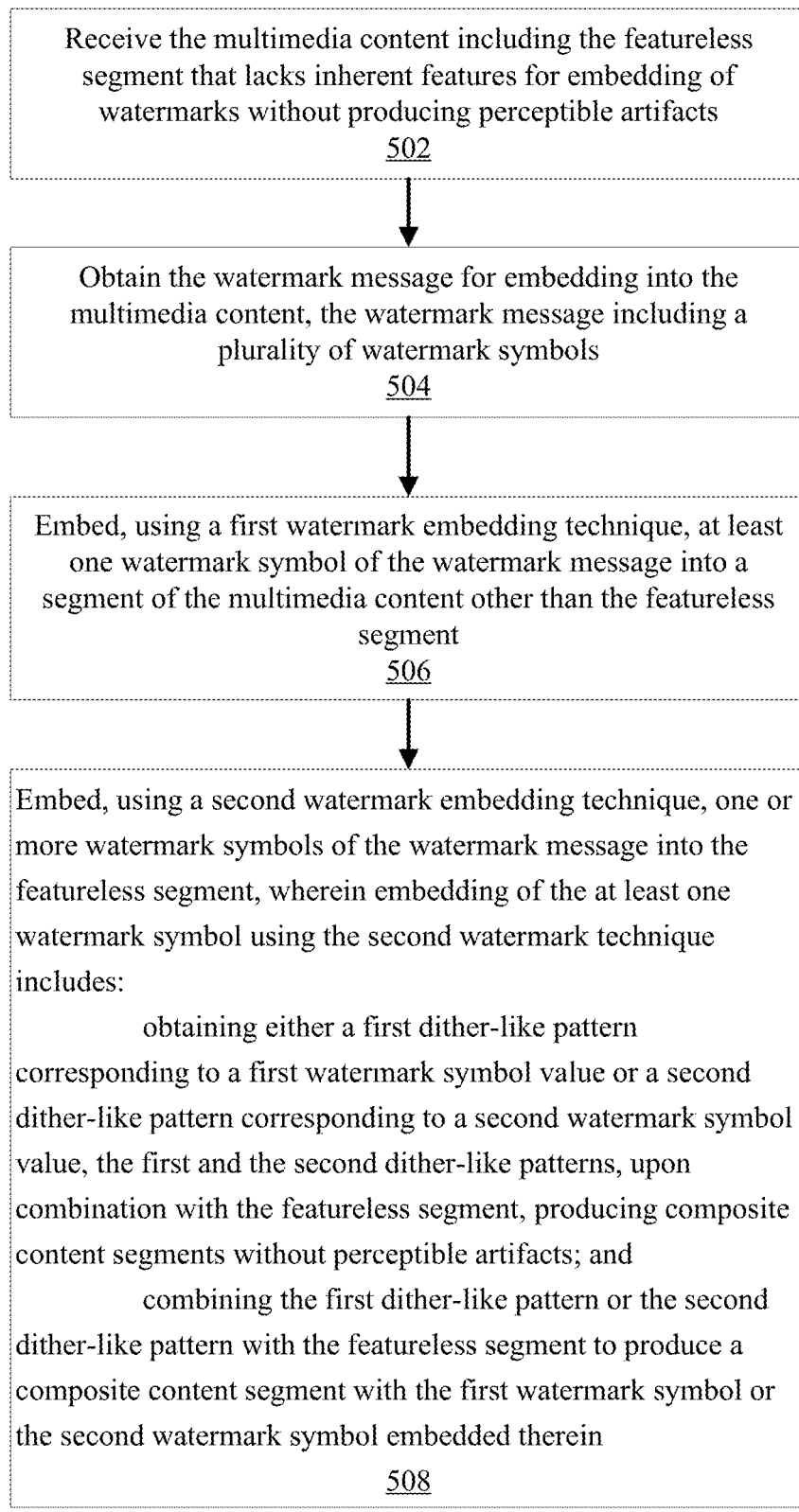
FIG. 5 illustrates a set of operations that can be carried out for embedding a watermark message into multiple segments of a multimedia including a featureless segment in accordance with an exemplary embodiment.

FIG. 5 illustrates a set of operations that can be carried out for embedding a watermark message into multiple segments of a multimedia including a featureless segment in accordance with an exemplary embodiment. At 502, the multimedia content is received that includes the featureless segment that lacks inherent features for embedding of watermarks without producing perceptible artifacts. At 504, the watermark message for embedding into the multimedia content is obtained; such a watermark message includes a plurality of watermark symbols. At 506, using a first watermark embedding technique, at least one watermark symbol of the watermark message is embedded into a segment of the multimedia content other than the featureless segment. At 508, using a second watermark embedding technique, one or more watermark symbols of the watermark message are embedded into the featureless segment. Embedding of the at least one watermark symbol using the second watermark technique includes obtaining either a first dither-like pattern corresponding to a first watermark symbol value or a second dither-like pattern corresponding to a second watermark symbol value, where the first and the second dither-like patterns, upon combination with the featureless segment, produce composite content segments without perceptible artifacts. Embedding of the at least one watermark symbol using the second watermark technique further includes combining the first dither-like pattern or the second dither-like pattern with the featureless segment to produce a composite content segment with the first watermark symbol or the second watermark symbol embedded therein.

Figure 6:
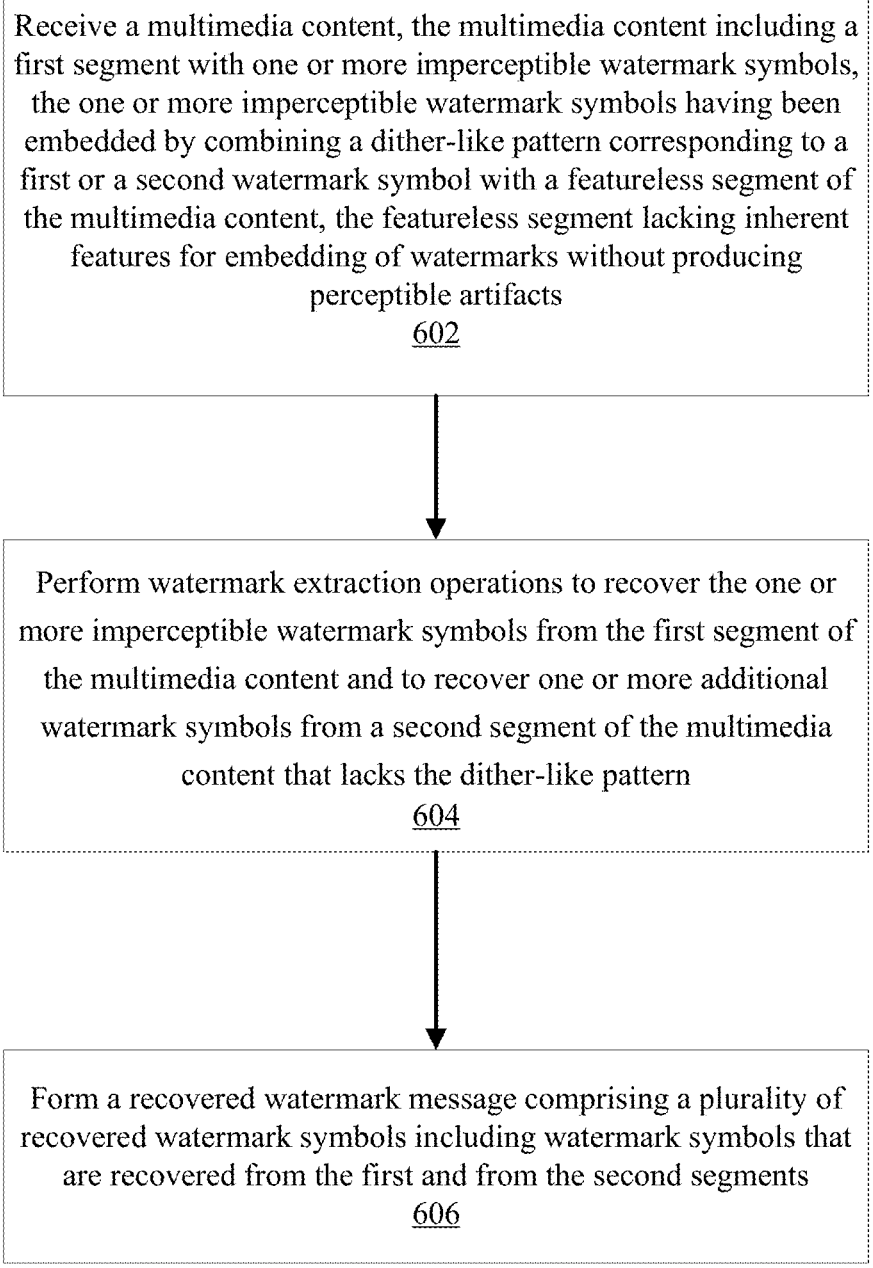
FIG. 6 illustrates a set of operations that can be carried out to facilitate detection of watermarks from a multimedia content in accordance with an exemplary embodiment.

FIG. 6 illustrates a set of operations that can be carried out to facilitate detection of watermarks from a multimedia content in accordance with an exemplary embodiment. At 602, a multimedia content that includes a first segment with one or more imperceptible watermark symbols is received, the one or more imperceptible watermark symbols having been embedded by combining a dither-like pattern corresponding to a first or a second watermark symbol with a featureless segment of the multimedia content. Such a featureless segment lacks inherent features for embedding of watermarks without producing perceptible artifacts. At 604, watermark extraction operations are performed to recover the one or more imperceptible watermark symbols from the first segment of the multimedia content and to recover one or more additional watermark symbols from a second segment of the multimedia content that lacks the dither-like pattern. At 606, a recovered watermark message is formed that includes a plurality of recovered watermark symbols including watermark symbols that are recovered from the first and from the second segments.

The components or modules that are described in connection with the disclosed embodiments can be implemented as hardware, software, or combinations thereof. For example, a hardware implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

For example, one aspect of the disclosed embodiments relates to a computer program product that is embodied on a non-transitory computer readable medium. The computer program product includes program code for carrying out any one or and/or all of the operations of the disclosed embodiments.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products, as well as in different sequential orders. Any embodiment may further be combined with any other embodiment.

What is claimed is:

1. A method for embedding a watermark into multiple segments of a multimedia content, comprising:
    receiving the multimedia content including a featureless segment of the multimedia content that lacks inherent features for embedding of watermarks without producing perceptible artifacts;
    obtaining a watermark message for embedding into the multimedia content, the watermark message including a plurality of watermark symbols;
    embedding, using a watermark embedder that is implemented at least partially in electronic circuits, at least one watermark symbol of the watermark message into a segment of the multimedia content other than the featureless segment, the at least one watermark symbol embedded according to a first watermark embedding technique; and
    embedding, using the watermark embedder, one or more additional watermark symbols of the watermark message into the featureless segment, the one or more additional watermark symbols embedded according to a second watermark embedding technique, wherein embedding of the one or more additional watermark symbols according to the second watermark technique includes:
        obtaining either a first dither-like pattern corresponding to a first watermark symbol value or a second dither-like pattern corresponding to a second watermark symbol value, each of the first and the second dither-like patterns formed as a low amplitude noise-like pattern which upon combination with the featureless segment of the multimedia content produces a segment having a watermark symbol embedded therein without perceptible artifacts; and
        combining the first dither-like pattern or the second dither-like pattern with the featureless segment to produce a composite content segment with the first watermark symbol or the second watermark symbol embedded therein, wherein the first dither pattern produces a positive autocorrelation value and the second dither pattern produces a negative autocorrelation value when combined with the featureless segment.

2. The method of claim 1, wherein the first logical value is one and the second logical value is a zero.

3. The method of claim 1, wherein the featureless segment is part of an audio component of the multimedia content.

4. The method of claim 3, wherein combining the first dither-like pattern or the second dither-like pattern with the featureless segment includes combining the first dither-like pattern or the second dither-like pattern with the featureless segment in a frequency band in the range 100 Hertz to 3000 Hertz.

5. The method of claim 1, wherein combining the first dither-like pattern or the second dither-like pattern with the featureless segment includes adding the first dither-like pattern or the second dither-like pattern to the featureless segment.

6. The method of claim 1, wherein each of the first or the second dither-like patterns includes a sum of a plurality of selected sinusoids, each sinusoid having a particular frequency such than when the plurality of sinusoids are added together, the sum of the selected sinusoids associated with the first dither-like pattern produces the positive autocorrelation value, and the sum of the selected sinusoids associated with the second dither-like pattern produces the negative autocorrelation value.

7. The method of claim 6, further comprising scaling the sum of the sinusoids to constrain peaks of the autocorrelation values within a predefined target range.

8. The method of claim 7, wherein the predefined target range is −1 to +1.

9. The method of claim 1, wherein the featureless segment is part of an image frame of the multimedia content.

10. The method of claim 1, wherein the first watermark embedding technique is an autocorrelation modulation technique, and the second watermark embedding technique is a variation of the autocorrelation modulation technique adapted to utilize the first or the second dither-like patterns.

11. The method of claim 1, wherein boundaries of the at least one watermark symbol of the watermark message that is embedded into the segment of the multimedia content other than the featureless segment is synchronized with boundaries of the one or more additional watermark symbols of the watermark message that are embedded into the featureless segment of the multimedia content.

12. The method of claim 1, wherein a boundary of the at least one watermark symbol of the watermark message that is embedded into the segment of the multimedia content other than the featureless segment does not overlap with a boundary of the one or more additional watermark symbols of the watermark message that are embedded into the featureless segment of the multimedia content.

13. The method of claim 1, wherein each of the first and the second watermark symbols is one of two or more watermark symbols of a watermark alphabet.

14. The method of claim 13, wherein each symbol of the watermark alphabet is represented by a particular dither pattern.

15. A method for embedding a watermark into multiple segments of a multimedia content, comprising:
    receiving the multimedia content including a featureless segment of the multimedia content that lacks inherent features for embedding of watermarks without producing perceptible artifacts;
    obtaining a watermark message for embedding into the multimedia content, the watermark message including a plurality of watermark symbols;
    embedding, using a watermark embedder that is implemented at least partially in electronic circuits, at least one watermark symbol of the watermark message into a segment of the multimedia content other than the featureless segment, the at least one watermark symbol embedded according to a first watermark embedding technique; and
    embedding, using the watermark embedder, one or more additional watermark symbols of the watermark message into the featureless segment, the one or more additional watermark symbols embedded according to a second watermark embedding technique, wherein embedding of the one or more additional watermark symbols according to the second watermark technique includes:

obtaining either a first dither-like pattern corresponding to a first watermark symbol value or a second dither-like pattern corresponding to a second watermark symbol value, each of the first and the second dither-like patterns formed as a low amplitude noise-like pattern which upon combination with the featureless segment of the multimedia content produces a segment having a watermark symbol embedded therein without perceptible artifacts; and combining the first dither-like pattern or the second dither-like pattern with the featureless segment to produce a composite content segment with the first watermark symbol or the second watermark symbol embedded therein, and wherein prior to embedding the one or more additional watermark symbols of the watermark message into the featureless segment, determining whether or not the featureless segment includes a pre-existing dither pattern; and upon a determination that the featureless segment includes the pre-existing dither pattern, removing the pre-existing dither pattern from the featureless segment.

16. A device, comprising:
a processor; and
a memory including processor executable code, the processor executable code when executed by the processor configures the device to:

receive a multimedia content including a featureless segment that lacks inherent features for embedding of watermarks without producing perceptible artifacts;

obtain a watermark message for embedding into the multimedia content, the watermark message including a plurality of watermark symbols;

embed, in accordance with a first watermark embedding technique, at least one watermark symbol of the watermark message into a segment of the multimedia content other than the featureless segment; and embed, in accordance with a second watermark embedding technique, one or more additional watermark symbols of the watermark message into the featureless segment, wherein embedding of the one or more additional watermark symbols in accordance with the second watermark technique includes:

obtaining either a first dither-like pattern corresponding to a first watermark symbol value or a second dither-like pattern corresponding to a second watermark symbol value, each of the first and the second dither-like patterns formed as a low amplitude noise-like pattern which upon combination with the featureless segment of the multimedia content produces an embedded segment having a watermark symbol embedded therein without perceptible artifacts; and combining the first dither-like pattern or the second dither-like pattern with the featureless segment to produce a composite content segment with the first watermark symbol or the second watermark symbol embedded therein, wherein the first dither pattern produces a positive autocorrelation value and the second dither pattern produces a negative autocorrelation value when combined with the featureless segment.

17. The device of claim 16, wherein the first logical value is one and the second logical value is a zero.

18. The device of claim 16, wherein the featureless segment is part of an audio component of the multimedia content.

19. The device of claim 18, wherein combining the first dither-like pattern or the second dither-like pattern with the featureless segment includes combining the first dither-like pattern or the second dither-like pattern with the featureless segment in a frequency band in the range 100 Hertz to 3000 Hertz.

20. The device of claim 16, wherein combining the first dither-like pattern or the second dither-like pattern with the featureless segment includes adding the first dither-like pattern or the second dither-like pattern to the featureless segment.

21. The device of claim 16, wherein each of the first or the second dither-like patterns includes a sum of a plurality of selected sinusoids, each sinusoid having a particular frequency such than when the plurality of sinusoids are added together, the sum of the selected sinusoids associated with the first dither-like pattern produces the positive autocorrelation value, and the sum of the selected sinusoids associated with the second dither-like pattern produces the negative autocorrelation value.

22. The device of claim 21, further comprising the sum of the sinusoids is scaled to constrain peaks of the autocorrelation values within a predefined target range.

23. The device of claim 22, wherein the predefined target range is −1 to +1.

24. The device of claim 16, wherein the featureless segment is part of an image frame of the multimedia content.

25. The device of claim 16, wherein the first watermark embedding technique is an autocorrelation modulation technique, and the second watermark embedding technique is a variation of the autocorrelation modulation technique adapted to utilize the first or the second dither-like patterns.

26. The device of claim 17, wherein boundaries of the at least one watermark symbol of the watermark message that is embedded into the segment of the multimedia content other than the featureless segment is synchronized with boundaries of the one or more additional watermark symbols of the watermark message that are embedded into the featureless segment of the multimedia content.

27. The device of claim 16, wherein a boundary of the at least one watermark symbol of the watermark message that is embedded into the segment of the multimedia content other than the featureless segment does not overlap with a boundary of the one or more additional watermark symbols of the watermark message that are embedded into the featureless segment of the multimedia content.

28. The device of claim 16, wherein each of the first and the second watermark symbols is one of two or more watermark symbols of a watermark alphabet.

29. The device of claim 16, wherein each symbol of the watermark alphabet is represented by a particular dither pattern.

30. A device, comprising:
a processor; and
a memory including processor executable code, the processor executable code when executed by the processor configures the device to:

receive a multimedia content including a featureless segment that lacks inherent features for embedding of watermarks without producing perceptible artifacts;

obtain a watermark message for embedding into the multimedia content, the watermark message including a plurality of watermark symbols;

embed, in accordance with a first watermark embedding technique, at least one watermark symbol of the watermark message into a segment of the multimedia content other than the featureless segment and embed, in accordance with a second watermark embedding technique, one or more additional watermark symbols of the watermark message into the featureless segment, wherein embedding of the one or more additional watermark symbols in accordance with the second watermark technique includes:

obtaining either a first dither-like pattern corresponding to a first watermark symbol value or a second dither-like pattern corresponding to a second watermark symbol value, each of the first and the second dither-like patterns formed as a low amplitude noise-like pattern which upon combination with the featureless segment of the multimedia content produces an embedded segment having a watermark symbol embedded therein without perceptible artifacts; and combining the first dither-like pattern or the second dither-like pattern with the featureless segment to produce a composite content segment with the first watermark symbol or the second watermark symbol embedded therein, and wherein the processor executable code when executed by the processor further configures the device to prior to embedding the one or more additional watermark symbols of the watermark message into the featureless segment, determine whether or not the featureless segment includes a pre-existing dither pattern; and upon a determination that the featureless segment includes the pre-existing dither pattern, remove the pre-existing dither pattern from the featureless segment.

31. A computer program product, embodied on one or more non-transitory computer readable media, comprising:

program code for receiving the multimedia content including the featureless segment that lacks inherent features for embedding of watermarks without producing perceptible artifacts;

program code for obtaining the watermark message for embedding into the multimedia content, the watermark message including a plurality of watermark symbols;

program code for embedding, using a first watermark embedding technique, at least one watermark symbol of the watermark message into a segment of the multimedia content other than the featureless segment; and program code for embedding, using a second watermark embedding technique, one or more additional watermark symbols of the watermark message into the featureless segment, wherein embedding of the one or more additional watermark symbols using the second watermark technique includes:

obtaining either a first dither-like pattern corresponding to a first watermark symbol value or a second dither-like pattern corresponding to a second watermark symbol value, each of the first and the second dither-like patterns formed as a low amplitude noise-like pattern which upon combination with the featureless segment of the multimedia content produces an embedded segment having a watermark symbol embedded therein without perceptible artifacts; and combining the first dither-like pattern or the second dither-like pattern with the featureless segment to produce a composite content segment with the first watermark symbol or the second watermark symbol embedded therein, wherein the first dither pattern produces a positive autocorrelation value and the second dither pattern produces a negative autocorrelation value when combined with the featureless segment.

32. A computer program product, embodied on one or more non-transitory computer readable media, comprising:

program code for receiving the multimedia content including the featureless segment that lacks inherent features for embedding of watermarks without producing perceptible artifacts;

program code for obtaining the watermark message for embedding into the multimedia content, the watermark message including a plurality of watermark symbols;

program code for embedding, using a first watermark embedding technique, at least one watermark symbol of the watermark message into a segment of the multimedia content other than the featureless segment; and program code for embedding, using a second watermark embedding technique, one or more additional watermark symbols of the watermark message into the featureless segment, wherein embedding of the one or more additional watermark symbols using the second watermark technique includes:

obtaining either a first dither-like pattern corresponding to a first watermark symbol value or a second dither-like pattern corresponding to a second watermark symbol value, each of the first and the second dither-like patterns formed as a low amplitude noise-like pattern which upon combination with the featureless segment of the multimedia content produces an embedded segment having a watermark symbol embedded therein without perceptible artifacts; and combining the first dither-like pattern or the second dither-like pattern with the featureless segment to produce a composite content segment with the first watermark symbol or the second watermark symbol embedded therein, and wherein prior to embedding the one or more additional watermark symbols of the watermark message into the featureless segment, determining whether or not the featureless segment includes a pre-existing dither pattern; and upon a determination that the featureless segment includes the pre-existing dither pattern, removing the pre-existing dither pattern from the featureless segment.

* * * * *